United States Patent
Greeff et al.

(10) Patent No.: US 6,871,253 B2
(45) Date of Patent: Mar. 22, 2005

(54) DATA TRANSMISSION CIRCUIT FOR MEMORY SUBSYSTEM, HAS SWITCHING CIRCUIT THAT SELECTIVELY CONNECTS OR DISCONNECTS TWO DATA BUS SEGMENTS TO RESPECTIVELY ENABLE DATA TRANSMISSION OR I/O CIRCUIT CONNECTION

(75) Inventors: Roy Greeff, Boise, ID (US); David Ovard, Meridian, ID (US); Terry R. Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 629 days.

(21) Appl. No.: 09/893,616

(22) Filed: Jun. 29, 2001

(65) Prior Publication Data

US 2002/0083255 A1 Jun. 27, 2002

Related U.S. Application Data

(63) Continuation-in-part of application No. 09/741,821, filed on Dec. 22, 2000.

(51) Int. Cl.$^7$ .................................................. G06F 1/00
(52) U.S. Cl. ....................... 710/316; 710/305; 710/317; 710/306
(58) Field of Search ................................. 710/305–317, 710/22–27, 33–43; 711/147–153, 173, 202

(56) References Cited

U.S. PATENT DOCUMENTS

| 4,470,114 | A | * | 9/1984 | Gerhold ....................... 710/111 |
| 5,081,648 | A |   | 1/1992 | Herzog |
| 5,623,644 | A |   | 4/1997 | Self et al. |
| 5,631,906 | A | * | 5/1997 | Liu ............................. 370/455 |
| 5,978,880 | A | * | 11/1999 | Bruce et al. ................. 710/316 |
| 6,182,178 | B1 | * | 1/2001 | Kelley et al. ................ 710/314 |
| 6,286,067 | B1 | * | 9/2001 | James et al. ................ 710/104 |
| 6,338,107 | B1 | * | 1/2002 | Neal et al. ................... 710/302 |
| 6,662,256 | B1 | * | 12/2003 | Foo ............................ 710/305 |
| 6,662,260 | B1 | * | 12/2003 | Wertheim et al. ........... 710/316 |
| 6,745,268 | B1 | * | 6/2004 | Greeff et al. ................ 710/100 |

FOREIGN PATENT DOCUMENTS

WO   WO99/30240   *   6/1999   ........... G06F/12/06

OTHER PUBLICATIONS

Gustavson, D., "SCIzzL: The Local Area Memory Port," http://www.scizzl.com, 9 pages, reviewed Oct. 2, 2000.
Gustavson, D. "SCI Industrial Takeup and Future Developments," http://www.scizzl.com/Perspectives.html, 13 pages, reviewed Oct. 2, 2000.
"Hot Rod™ High–Speed Seral Link Gallium Arsenide," Gazelle Microcircuits, Inc. pp. 1–35.

* cited by examiner

Primary Examiner—Paul R. Myers
Assistant Examiner—Raymond N Phan
(74) Attorney, Agent, or Firm—Dickstein Shapiro Morin & Oshinsky LLP

(57) ABSTRACT

A method and associated apparatus is provided for improving the performance of a high speed memory bus using switches. Bus reflections caused by electrical stubs are substantially eliminated by connecting system components in a substantially stubless configuration using a segmented bus wherein bus segments are connected through switches. The switches disconnect unused bus segments during operations so that communicating devices are connected in an substantially point-to-point communication path.

122 Claims, 17 Drawing Sheets

US 6,871,253 B2

DATA TRANSMISSION CIRCUIT FOR MEMORY SUBSYSTEM, HAS SWITCHING CIRCUIT THAT SELECTIVELY CONNECTS OR DISCONNECTS TWO DATA BUS SEGMENTS TO RESPECTIVELY ENABLE DATA TRANSMISSION OR I/O CIRCUIT CONNECTION

This application is a continuation-in-part (CIP) of application Ser. No. 09/741,821 filed on Dec. 22, 2000, which is hereby incorporated by reference.

FIELD OF THE INVENTION

The present invention relates to improving the signal integrity and performance of a high speed bus for data communications.

BACKGROUND OF THE INVENTION

Memory device manufacturers are under continuous pressure to increase the performance and reduce the cost of memory devices. Memory systems for computers typically provide many memory devices on a common multidrop bus to allow larger storage and transmission capacities than can be obtained with a single memory device. To improve the maximum throughput of the bus, data communicated to and from the memory devices may be multiplexed for transmission on the bus, thereby reducing the pin count of a memory bus master or controller. For example, a 64-bit wide data word may be transmitted over a 16 bit data bus as four successive 16-bit data word portions.

In addition, such systems typically include user upgradable or replaceable components to allow future expansion or repair of the memory subsystems. Typically, these systems are upgraded on a module basis, where the memory module (e.g., a dual in-line memory module or DIMM) includes several memory devices on a small printed circuit board (PCB), and the module plugs into a connector that provides an electrical connection to the memory subsystem bus.

Connection of multiple memory devices to the bus can degrade the performance of the bus since the modules are typically connected in a configuration having electrical stubs which cause signal reflections on the bus. These reflections degrade signal integrity, thus limiting the maximum speed and bandwidth of the system. A robust electrical design is required in a high speed multidrop memory bus since the signal integrity must be acceptable throughout the system for lightly loaded systems, that is, where only a small number of module slots are populated, as well as heavily loaded systems where every module slot, or nearly every module slot, is populated.

In addition, although high speed communication between memory devices can be done using a transmission line or bus that is properly terminated, the speed at which data is passed can be limited by the capacitance of the memory devices and the resistance of circuit elements used to terminate the bus. As noted, bus reflections can limit the speed of data transmission as well.

Accordingly, there is a strong desire and need to improve the performance characteristics of memory bus systems and other data bus systems in order to permit high speed operation with minimal degradation of signal integrity due to bus reflections.

SUMMARY OF THE INVENTION

The present invention provides a method and associated apparatus for improving the performance of a high speed data bus, e.g., a memory bus. The invention mitigates bus reflections caused by electrical stubs by connecting contemporaneously-selected system components in a stubless or substantially stubless configuration using switches, for example field effect transistor (FET) or other electronic switches.

In one aspect, the invention provides a high speed segmented bus in which the individual bus segments are connected by switches. The switches are configured to connect those segments required for communications between currently selected data input/output devices, e.g. memory modules, and disconnect the remaining segments. The resulting bus connects the currently selected data input/output devices in an essentially point-to-point communications configuration for reduced signal reflections and improved signal integrity.

In another aspect, the invention provides a method of data communication between data exchanging devices which maintains a substantially stubless environment. A first set of I/O pins and a second set of I/O pins are provided at data input/output devices, e.g., memory modules, for connecting respective first and second segments of a data bus through a switching circuit, e.g., a FET switch, at each data input/output device on the bus. Data is received and transmitted on the data bus using at least the first set of I/O pins, and data on the data bus is selectively passed through from the first bus segment to the second bus segment and from the second bus segment to the first bus segment using the switching circuit.

BRIEF DESCRIPTION OF THE DRAWINGS

The foregoing and other features, advantages and structural implementations of the invention will become more apparent from the detailed description of the exemplary embodiments of the invention given below with reference to the accompanying drawings in which.

DETAILED DESCRIPTION OF THE PREFERRED EMBODIMENTS

The invention provides a bus system including switches which can be used to interconnect data input/output devices and/or bus segments. While the invention is described below with reference to a bus system for a memory system, including memory modules as representative data input/output devices, it should be understood that the bus and switch topology of the invention may be used with any type of data input/output device. Likewise, it should be understood that the memory controller described in the context of a memory system may be a bus controller for use with other data input/output devices besides memory modules.

Figure 1:
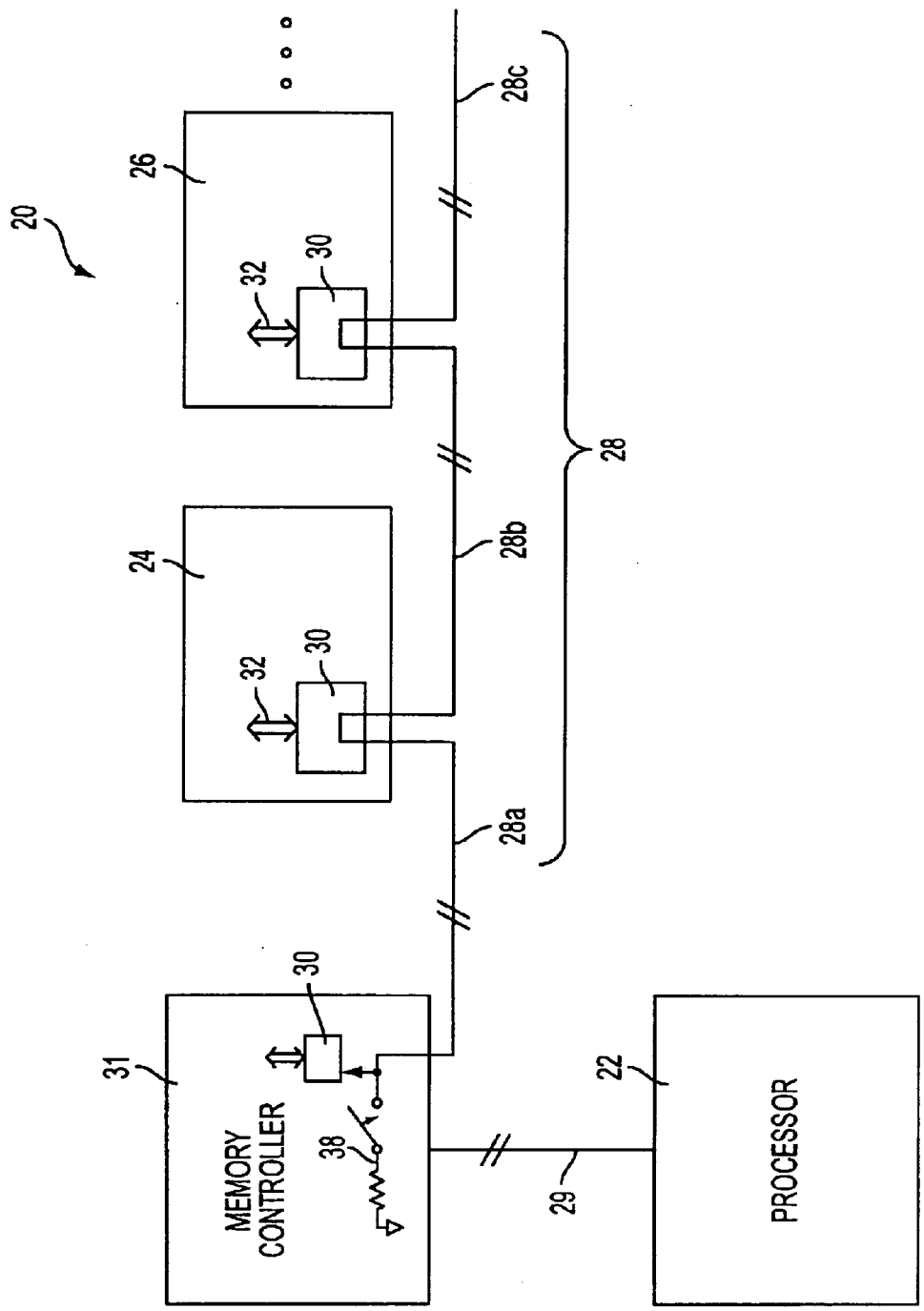
FIG. 1 illustrates a bus topology formed in accordance with a first exemplary embodiment of the invention.

Referring to FIG. 1, an exemplary processor system 20 including a memory subsystem is illustrated employing a high speed bus system. The processor system 20 includes several data input/output devices, which take the form of memory modules 24, 26, connected to a memory controller 31 with a segmented data bus 28, and a processor 22 connected to the memory controller 31 via a conventional bus 29. Each of the memory modules 24, 26, as well as the memory controller 31, has an associated integrated interface circuit 30 connecting each to the segmented data bus 28. Each integrated interface circuit 30 permits data exchange between the segmented data bus 28 and another data pathway, for example, a second data bus 32, shown at each of the respective memory modules 24, 26. The second data bus 32 is connected to individual memory devices, e.g., DRAM chips, provided on the modules 24, 26.

Figure 2:
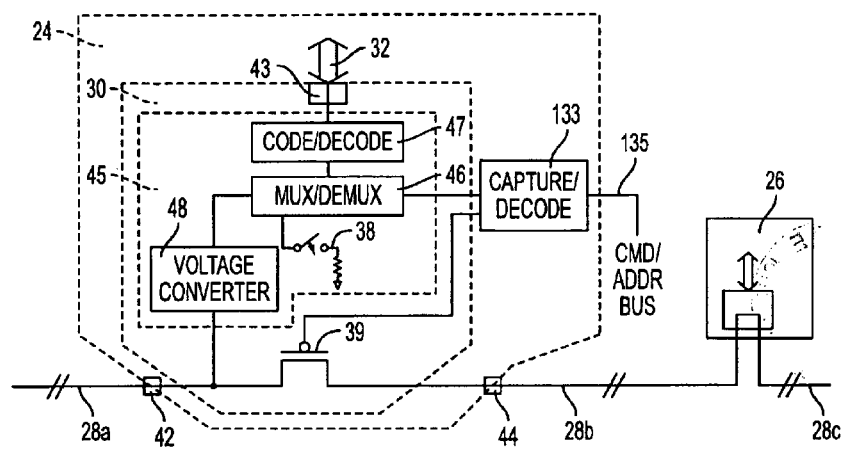
FIG. 2 illustrates in greater detail a portion of FIG. 1.
Figure 3:
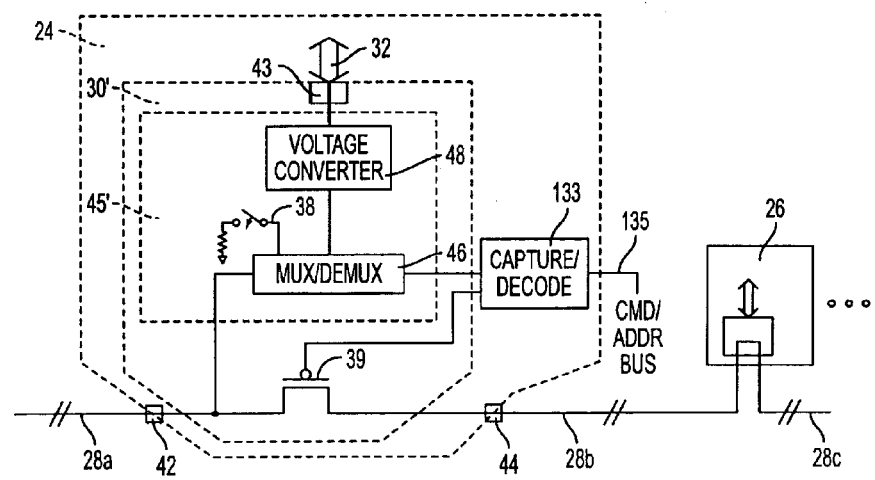
FIG. 3 illustrates a modified first embodiment of the portion shown in FIG. 2.
Figure 8:
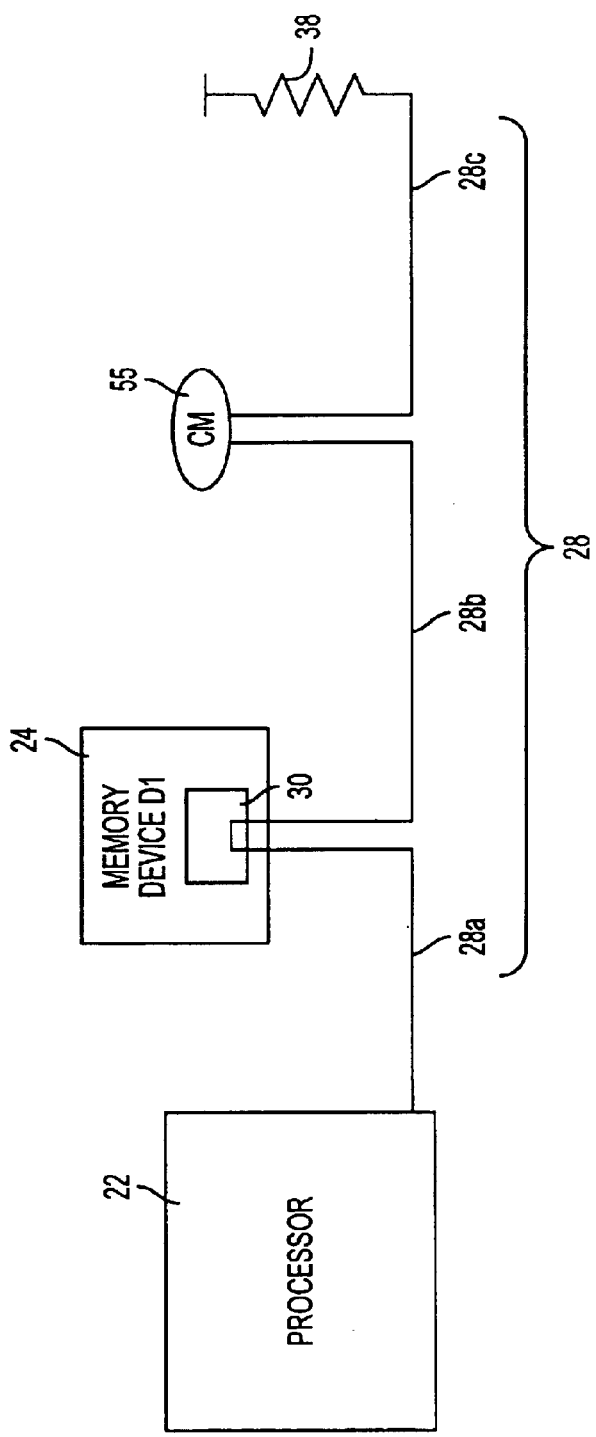
FIG. 8 illustrates a bus topology formed in accordance with another exemplary embodiment of the invention.
Figure 12:
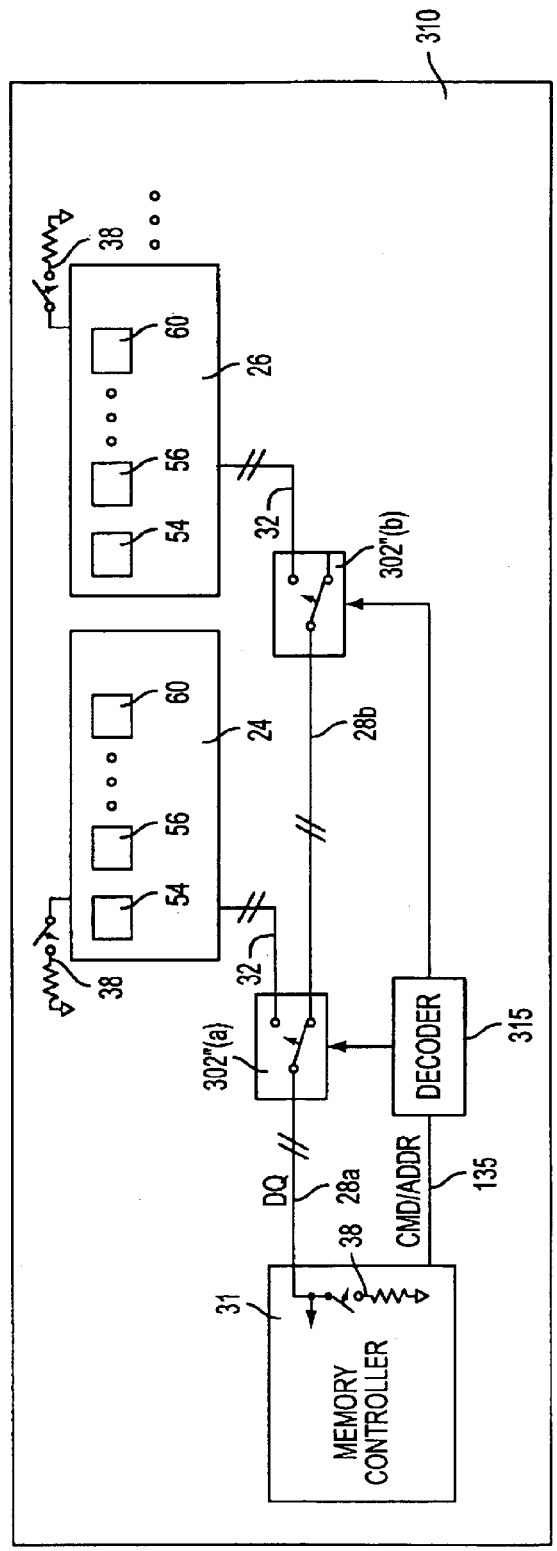
FIG. 12 illustrates a bus and switch topology formed in accordance with another exemplary embodiment of the invention.
Figure 13:
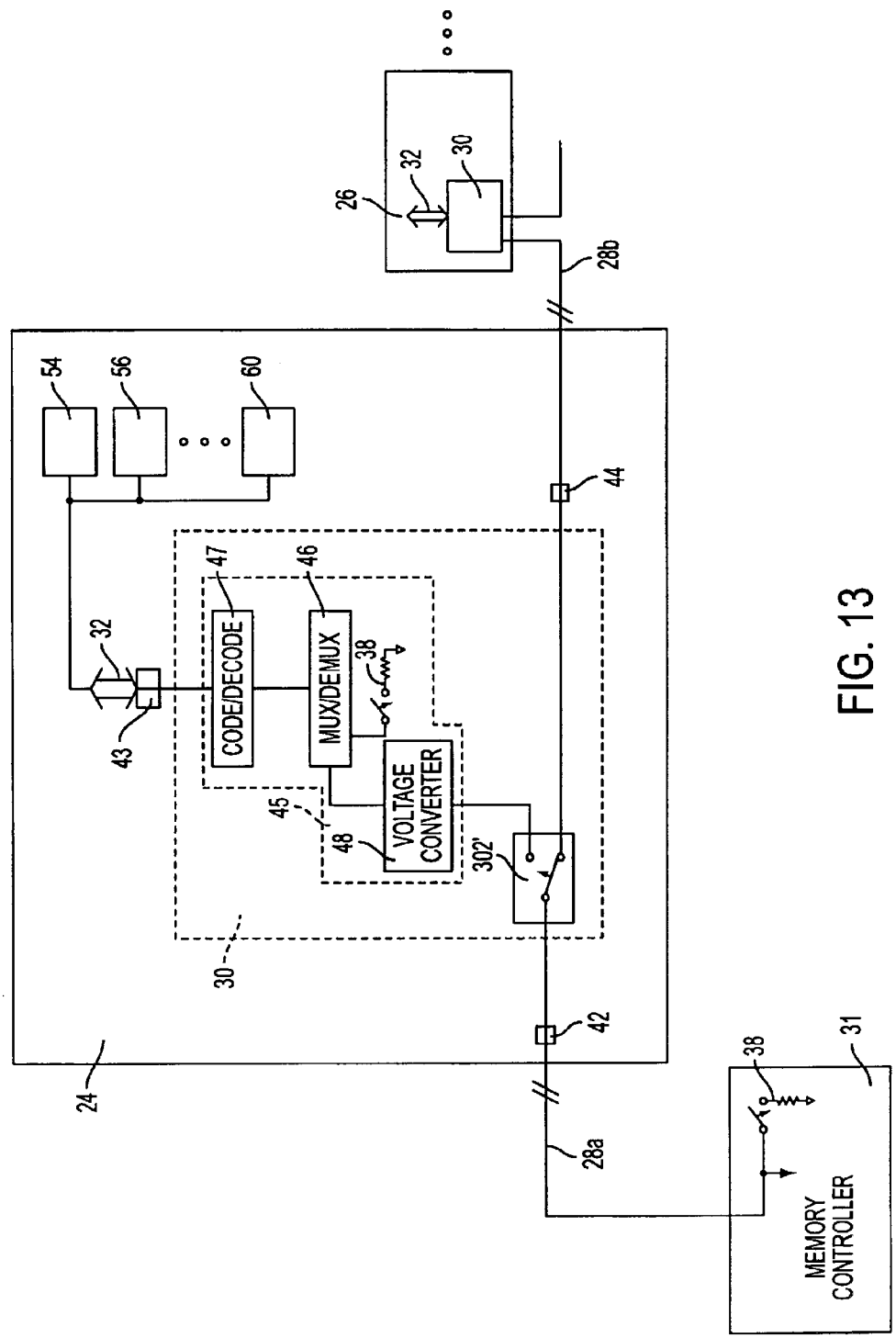
FIG. 13 illustrates a bus and switch topology formed in accordance with another exemplary embodiment of the invention.
Figure 14:
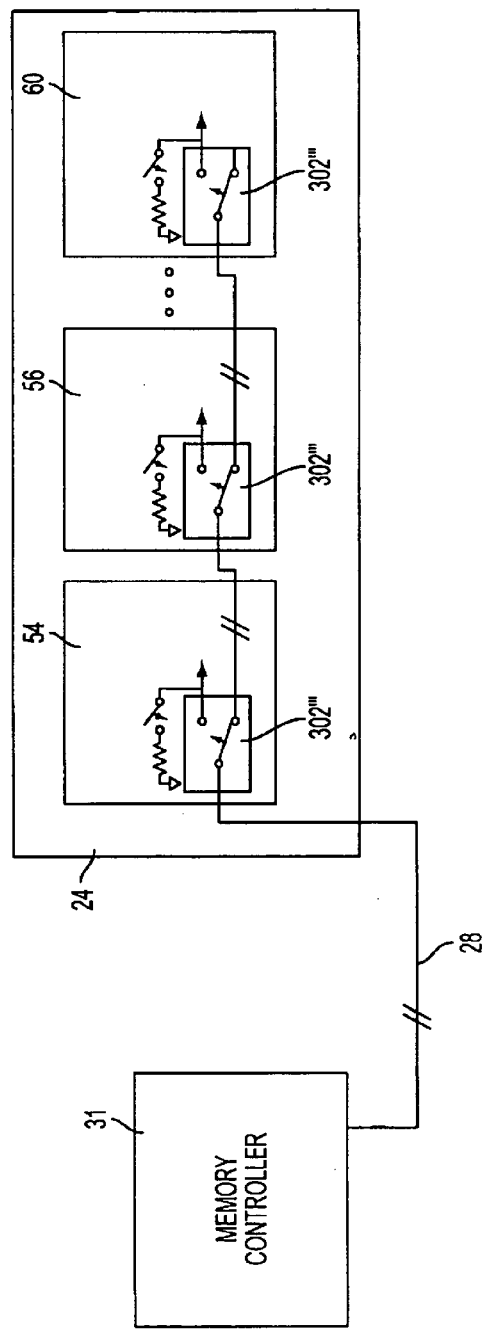
FIG. 14 illustrates a bus and switch topology formed in accordance with another exemplary embodiment of the invention.

The segmented data bus 28 may be a multidrop bus and may be terminated by a bus terminator, for example a bus terminating resistor 38. The bus terminating resistors may be located at the memory controller as shown in FIG. 1, at one end of the bus as shown in FIG. 8, at the interface circuit 30 as shown in FIGS. 2, 3 and 13, at the memory modules 24,26 as shown in FIG. 12, and/or at each memory device 54, 56, 60 as shown in FIG. 14. The bus terminating resistor 38 may be a switched terminator to permit switchable termination (i.e., termination enabled (ON) or termination disabled (OFF)) for varying data transfer operations. For example, the switched terminator 38 at the memory controller 31 (FIG. 1) may be enabled during data READ operations, but may disabled during data WRITE operations. Similarly, the switched terminator 38 at the memory device 54, 56, 60 (FIG. 14) selected for data operations may be enabled during data WRITE operations, but may be disabled during data READ operations. The switched terminator 38 may provide source termination for alleviation of the effect of bus reflections, improving data transfer performance.

Although two memory modules 24, 26 are illustrated, it should be understood that any number of memory modules may be connected to bus 28 in accordance with the invention.

The segmented data bus 28 may be a conventional m-bit parallel bus having command and address paths, data paths, and clock (timing) paths. The segmented data bus 28 may have a bus width of any number of parallel data paths, but typically has fewer data paths than a second data bus 32 attached to the interface circuit 30. As one example, the segmented data bus 28 may be 16 bits wide (16 data paths) while the second data bus 32 may be 64 bits wide (64 data paths). Accordingly, and as described below, data from the memory devices connected to the wide bus 32 can be multiplexed by interface circuit 30 onto the narrower bus 28, while data on bus 28 can be demultiplexed and placed on bus 32. Accordingly, bus 28 operates at a higher data transfer speed than bus 32, enabling memory modules 24, 26 to use lower speed memory devices than would otherwise be required with a high speed bus.

Since the segmented data bus 28 has a smaller number of data paths than data bus 32, the integrated interface circuits 30 connect to the segmented data bus 28 with a low pin count connection.

Each interface circuit 30 includes a switching circuit, e.g., a FET switch 39 as illustrated in FIGS. 2 and 3, through which the segmented data bus 28 is connected for communication with the memory modules 24, 26. In this way, memory modules 24, 26 on the segmented data bus 28 can be connected in a "daisy chain." This configuration substantially eliminates bus reflections caused by electrical stubs by selectively connecting system components in a substantially stubless configuration which improves the data rate which can be achieved on bus 28.

For example, when a memory module 26 is selected for operations, e.g. a READ or WRITE operation, a switching circuit, e.g., FET switch 39, at the memory module 26 disconnects the remainder of the segmented data bus 28 including segment 28c. Simultaneously, a switching circuit, e.g., FET switch 39, at the memory module 24 permits data to pass through between bus segment 28a and bus segment 28b. In this way, the memory module 26 and the memory controller 31 may be connected in a point-to-point data connection substantially free of stubs during the READ or WRITE operation.

Although the switching circuits, e.g., FET switches 39, are described as being located on the memory modules 24, 26, they may alternatively be positioned at other locations, for example, on a memory device 54, 56, 58, 60, or at locations external to both the memory modules 24, 26 and memory devices 54, 56, 58, 60. For example, FIGS. 2 and 3 illustrate embodiments of the invention in which the switch, e.g., FET switch 39, is located on the interface 30, which is located on the memory module 24. In another example, as shown in FIG. 14, one or more switches 302''' may be located on respective memory devices 54, 56, 58, 60. In another example, as shown in FIGS. 12 and 16, each switch (302' in FIG. 12 and 39 in FIG. 16) may be located external to both the memory modules 24, 26 and the memory devices 54, 56, 60.

Figure 16:
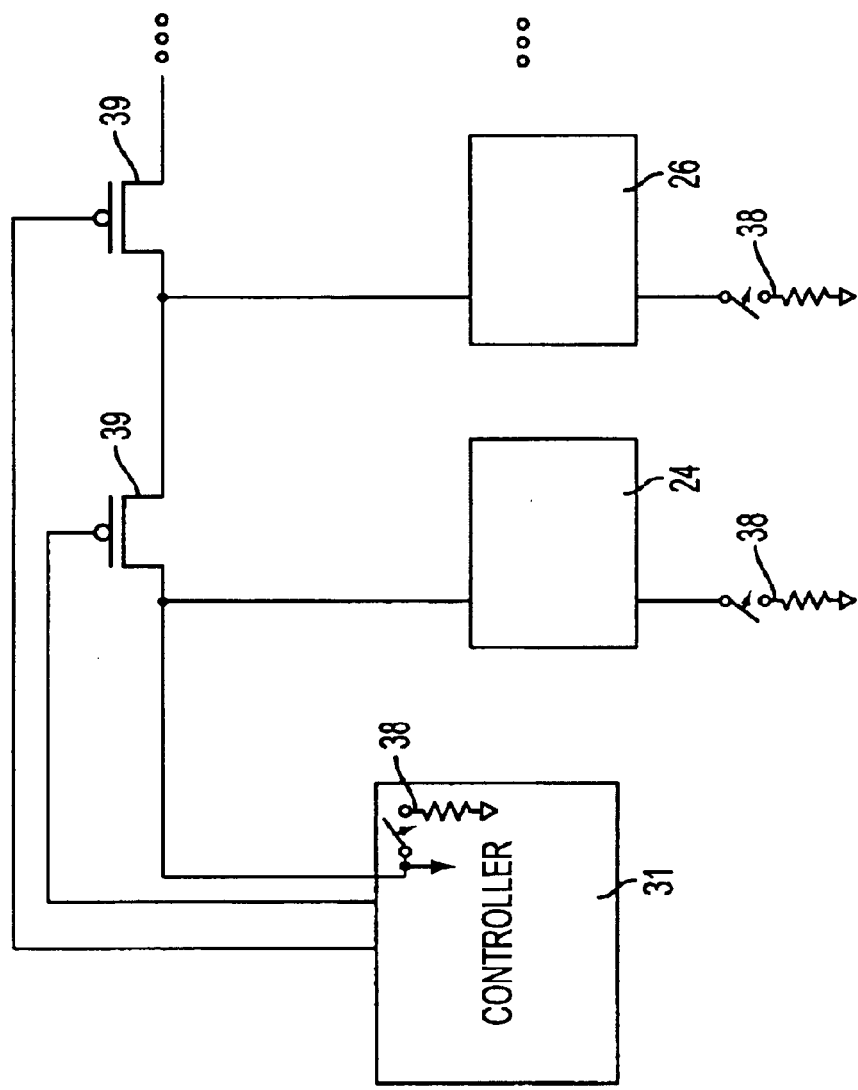
FIG. 16 illustrates a bus and switch topology formed in accordance with another exemplary embodiment of the invention.

For embodiments of the invention including external switches, as shown in FIGS. 12 and 16, the switches (302', FIG. 12; 39, FIG. 16) may advantageously employ differing semiconductor technology from the memory devices or other integrated circuit structures. For example, each of the external switches 302', 39 may be formed using Gallium Arsenide (GaAs) semiconductor technology for increased switching performance.

Figure 9:
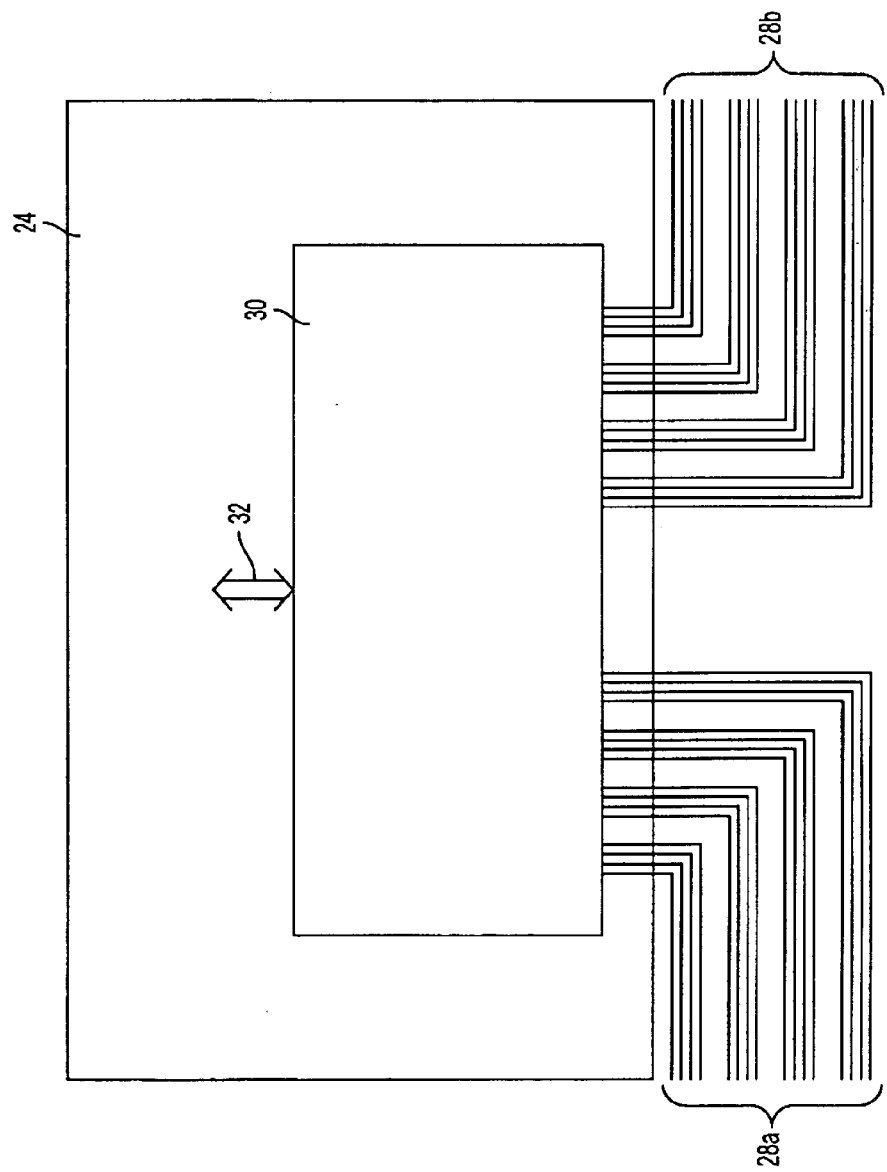
FIG. 9 illustrates a portion of the topology of FIG. 1 in accordance with another exemplary embodiment of the invention.

Referring back to FIG. 2, which shows the switch 39 provided on the module 24, each integrated interface circuit 30 may be connected to the segmented data bus 28 by first 42 and second 44 sets of I/O pins (pads). A first set of I/O pins 42 may be connected to a first bus segment 28a and a second set of I/O pins 44 may be connected to a second bus segment 28b. The first and second sets of I/O pins 42, 44 are connected internally within the integrated interface circuit 30 through the switching circuit, which as noted is illustrated in FIG. 2 as FET switch 39. The I/O pins 42 are also connected to a conversion circuit 45 which converts data appearing on the segmented data bus 28 for use on a second bus 32. For the example earlier described of a 16 bit data path on bus 28 and a 64 bit data path on bus 32, each set of I/O pins 42 will contain 16 pins for the data path, as shown in FIG. 9. Likewise, there would be 16 I/O pins 44 for connection with downstream bus segments, e.g., 28b.

The FET switch 39 in FIG. 2 optionally connects the first bus segment 28a with the second bus segment 28b for optional pass-through of data on the segmented data bus 28. It should be remembered that FIGS. 2, 3 only show one bus data path and that therefore only one FET switch 39 is shown, but in actuality each data path (16 in the example given) will have respective bus segments 28a, 28b and an associated FET switch 39.

Data on the segmented data bus 28 may pass through the I/O pins 42, 44 and FET switch 39 and pass to and from downstream memory modules, or may be optionally received by the interface circuit 30 in which case the FET switch 39 on an associated module will be open. Any data received at an interface circuit 30 may then be converted in conversion circuit 45 for use on the second bus 32. Likewise, data on bus 32 may be converted by conversion circuit 45 and passed through pins 42 back to the memory controller 31. Thus, during typical operations, the FET switch 39 is configured to disconnect the first bus segment 28a from the second bus segment 28b while the interface circuit 30 is receiving transmitted data through circuit 45 between bus segment 28a and the second bus 32. Likewise, the FET switch 39 is typically configured to connect the first and second bus segments 28a, 28b and pass data through while the interface circuit 30 is not selected for operations.

Data may be selectively received by the interface circuit 30 according to a selection signal received at the integrated interface circuit 30. The selection signal may be available to the interface circuit 30 on a conventional non-segmented memory system command and address bus 135, as shown in FIG. 2. For example, signals received from a conventional command and address bus 135 are captured and decoded by circuitry 133 and may contain instructions for controlling reception of data at integrated interface circuit 30, for example, a WRITE command directing the integrated interface circuit 30 to receive data available on the segmented data bus 28 for storage at a memory device connected to the second data bus 32. The command and address bus 135 may also provide each memory module 24, 26 with address signals for read and write operations.

Signals from the capture/decode circuitry 133 may be passed on to the multiplexer/demultiplexer 46 and/or the switching circuit 39 when the interface circuit 30 is selected for operations, e.g., a WRITE command, to activate the conversion circuit 45 and disconnect the first and second bus segments 28a, 28b. Thus, point-to-point data communications may then be performed between the interface circuit 30 and another system device, e.g. a memory controller 31 (FIG. 1).

Figure 11:
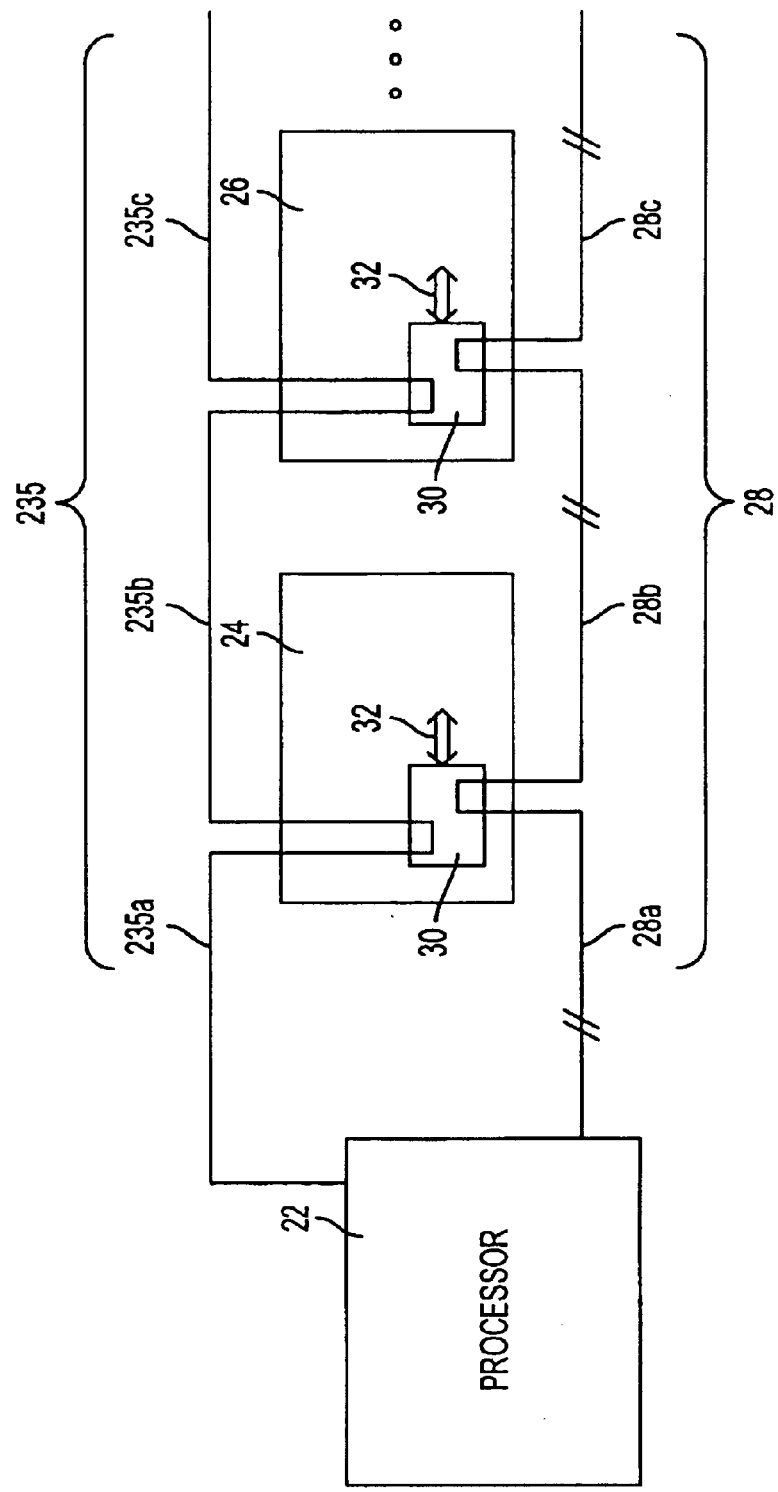
FIG. 11 illustrates a bus topology formed in accordance with another exemplary embodiment of the invention.

As an alternative to the configuration shown in FIG. 2, selection signals may be made available to the interface circuit 30 on a segmented command and address bus 235, as illustrated in FIG. 11, having a construction similar to the segmented data bus 28 for selectively passing selection signals and other information used by the interface circuit 30 through closed switches to downstream command/address bus segments, or prevents such passage by an open switch. Referring to FIG. 11, the segmented command and address bus 235 may include segments 235a, 235b, 235c, connecting the integrated interface circuits 30 of the system components.

An alternative to the use of selection signals such as those provided on the command and address bus 135 is to embed selection signals in signals transmitted on the segmented data bus 28 shown in FIG. 1 during times when no data is being transmitted.

Referring again to FIG. 2, the second data bus 32 may have operating requirements that differ from those of segmented data bus 28, for example the second data bus 32 may be a higher pin count, higher voltage, lower data rate bus that uses a data encoding different from that of the segmented data bus 28. Therefore, the conversion circuit 45 may convert the data received from the segmented data bus 28 for use on the second data bus 32. The conversion circuit 45 may include a multiplexer/demultiplexer 46 for converting the data rate and number of data paths (e.g., between 16 and 64 data paths), a coder/decoder 47 for appropriately coding/decoding the data between buses 28 and 32, and a voltage converter 48, which permit data available on the segmented data bus 28 to be appropriately configured for the second bus 32 and vice versa.

As shown in FIG. 2, voltage conversion may be performed using a voltage converter 48 provided between the segmented data bus 28 and the multiplexer/demultiplexer 46. This is not required, however, and as illustrated in the integrated interface circuit 30' shown in FIG. 3, voltage conversion may instead be performed at a voltage converter 48 located between the second data bus 32 and the multiplexer/demultiplexer 46. Of course, if voltage conversion is not needed, voltage converter 48 may be omitted.

The conversion circuit 45 may convert data on the segmented data bus 28 for use on the second data bus 32, but the corresponding conversion in the opposite direction (i.e., from the second data bus 32 to the segmented data bus 28) may also be performed by the conversion circuit 45 in accordance with the invention.

The integrated interface circuit 30 may be turned off when the second data bus 32 is not active, for example in response to selection signals received on the command and address bus 135. When selection signals received indicate that the interface circuit 30 is turned off, the switching circuit 39 connects the first and second segments 28a, 28b of the segmented data bus 28. When selection signals indicate that the interface circuit 30 is turned on, the switching circuit 39 disconnects the first segment 28a from the second segment 28b to form a point-to-point communications path for data being communicated using the interface circuit 30.

The switching circuit 39 may comprise, for example, a field effect transistor (FET) switch, for example a p-channel transistor as illustrated in FIGS. 2 and 3. The p-channel transistor defaults to the on, or pass-through, state in which data is permitted to pass between bus segments 28a, 28b, 28c. When the gate of the p-channel transistor is activated, the bus segments on either side of the switch are disconnected and data is not permitted to pass through. In this way, a selection signal received at the capture/decode circuitry 133 simultaneously activates the conversion circuit 45 and disconnects the first and second bus segments 28a, 28b, so that the interface circuit 30 and another system component may communicate in a substantially stubless environment using an essentially point-to-point communications path. It should be understood that other types of known switching circuits 39 may also be used in place of the FET switch.

Figure 4:
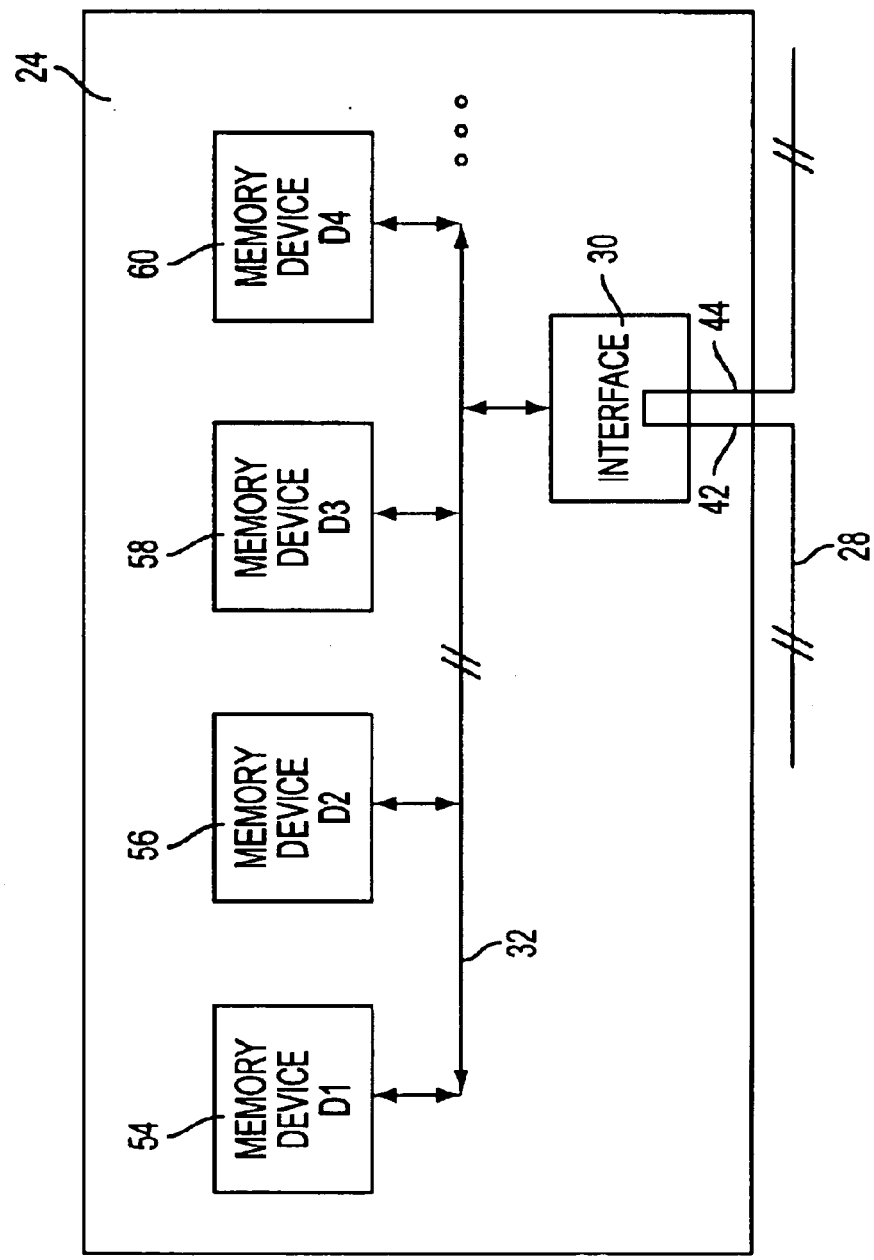
FIG. 4 illustrates a memory module formed in accordance with a first exemplary embodiment of the invention.

As noted, one potential use of segmented bus 28 is for a memory system including memory modules 24, 26. FIG. 4 illustrates one of the memory modules 24, which includes a plurality of memory devices 54, 56, 58, 60, mounted on a printed circuit board with the integrated interface circuit 30. Each of the memory devices 54, 56, 58, 60 is connected to a memory bus 32 that also connects to the integrated interface circuit 30. The integrated interface circuit 30 includes a switching circuit, for example a FET switch 39 (FIG. 2), connected between bus segments. In addition, the integrated interface circuit 30 connects to the segmented data bus 28 using the first and second sets of I/O pins 42, 44.

In operation, the integrated interface circuit 30 receives/transmits data from/to another device connected to the segmented data bus 28, e.g., from a memory controller 31, and converts the data to/from the memory bus 32 which is coupled to the individual memory devices 54, 56, 58, 60. Any necessary data rate, voltage, or other conversions which may be required for data to be exchanged between the segmented data bus 28 and the memory bus 32, for example between the memory controller 31 and the memory devices 54, 56, 58, 60, are performed at interface 30. For example, referring to FIGS. 1 and 4, the integrated interface circuit 30 may be connected to the memory controller 31 via the segmented data bus 28, which operates at a 1 Gbit/sec data rate, 1 volt voltage level, and a narrow bus width (low pin count) of 16 data paths (bits). In contrast, the memory bus 32, connected to the integrated interface circuit 30, may operate at a 250 Mbit/sec data rate, 1.8 volt voltage level, and a wide bus width (high pin count) of 64 data paths (bits). For a memory WRITE operation initiated by the processor 22 or the memory controller 31 to store data using the memory devices 54, 56, 58, 60, the WRITE data is transmitted on the segmented data bus 28 from the memory controller 31 to the integrated interface circuit 30, the WRITE data is converted, and transmitted on the memory bus 32 to one or more of the memory devices 54, 56, 58, 60. READ data from the memory devices 54, 56, 58, 60 flows in the opposite direction to the memory controller 31.

Figure 7:
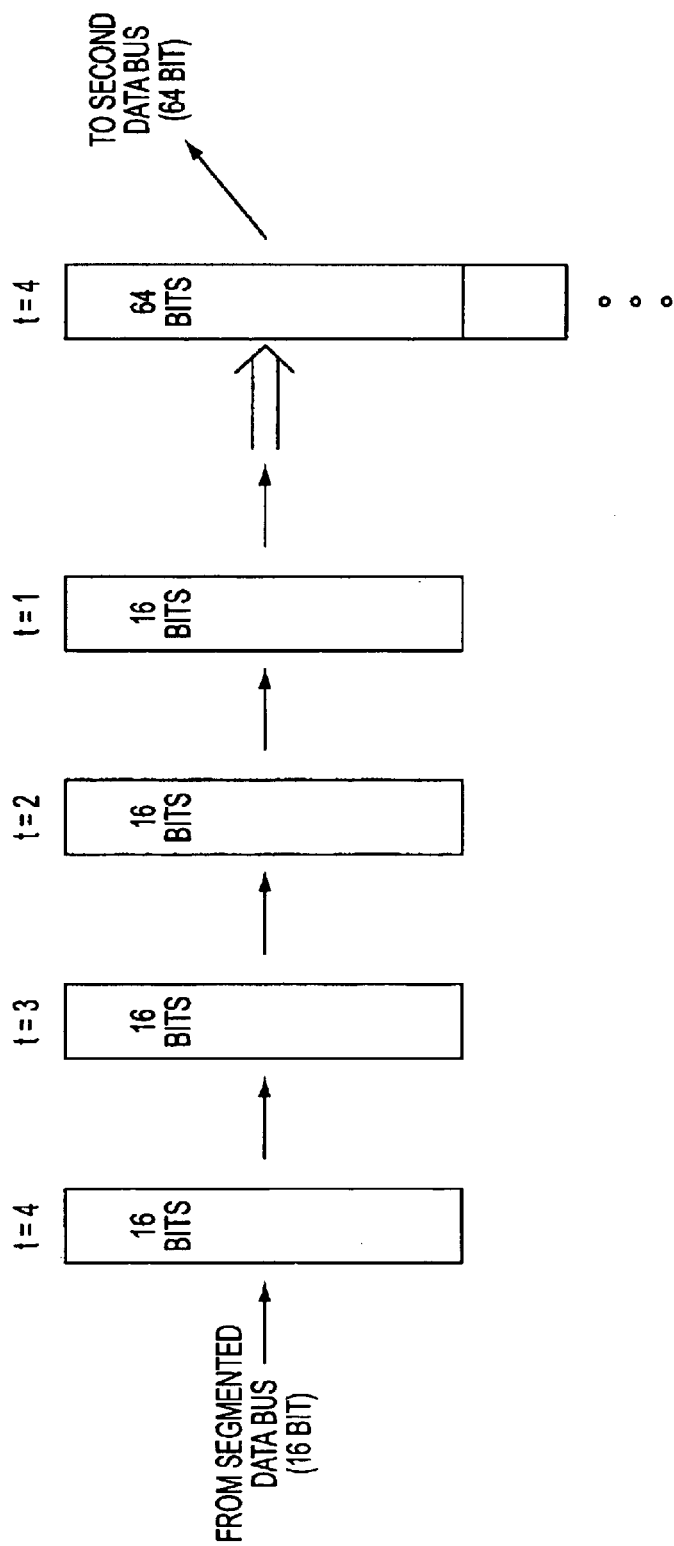
FIG. 7 illustrates a timing example in accordance with an exemplary embodiment of the invention.

FIG. 7 illustrates a timing example for data exchange between a 16-bit segmented data bus 28 and a 64-bit memory bus 32. The integrated interface circuit 30 may receive 16 bits of data at time t=1, t=2, t=3, and t=4. At time t=4, after the integrated interface circuit 30 has received a total of 64 bits of data, from the segmented data bus 28, the received data may be passed to the memory bus 32 via the 64 data paths of the memory bus 32. This data rate conversion and/or buffering may be performed using the multiplexer/demultiplexer 46 (FIG. 2). Any other voltage conversions or data encoding/decoding functions needed are performed at the interface circuit 30 as described above and illustrated in FIGS. 2 and 3.

For a memory READ operation, the converse data transfer operation from the memory devices 54, 56, 58, 60, to the memory controller 31 is performed. That is, 64 bits of data on bus 32 are multiplexed by interface circuit 30 as four 16 bit data segments which are sequentially placed on segmented data bus 28.

Figure 5:
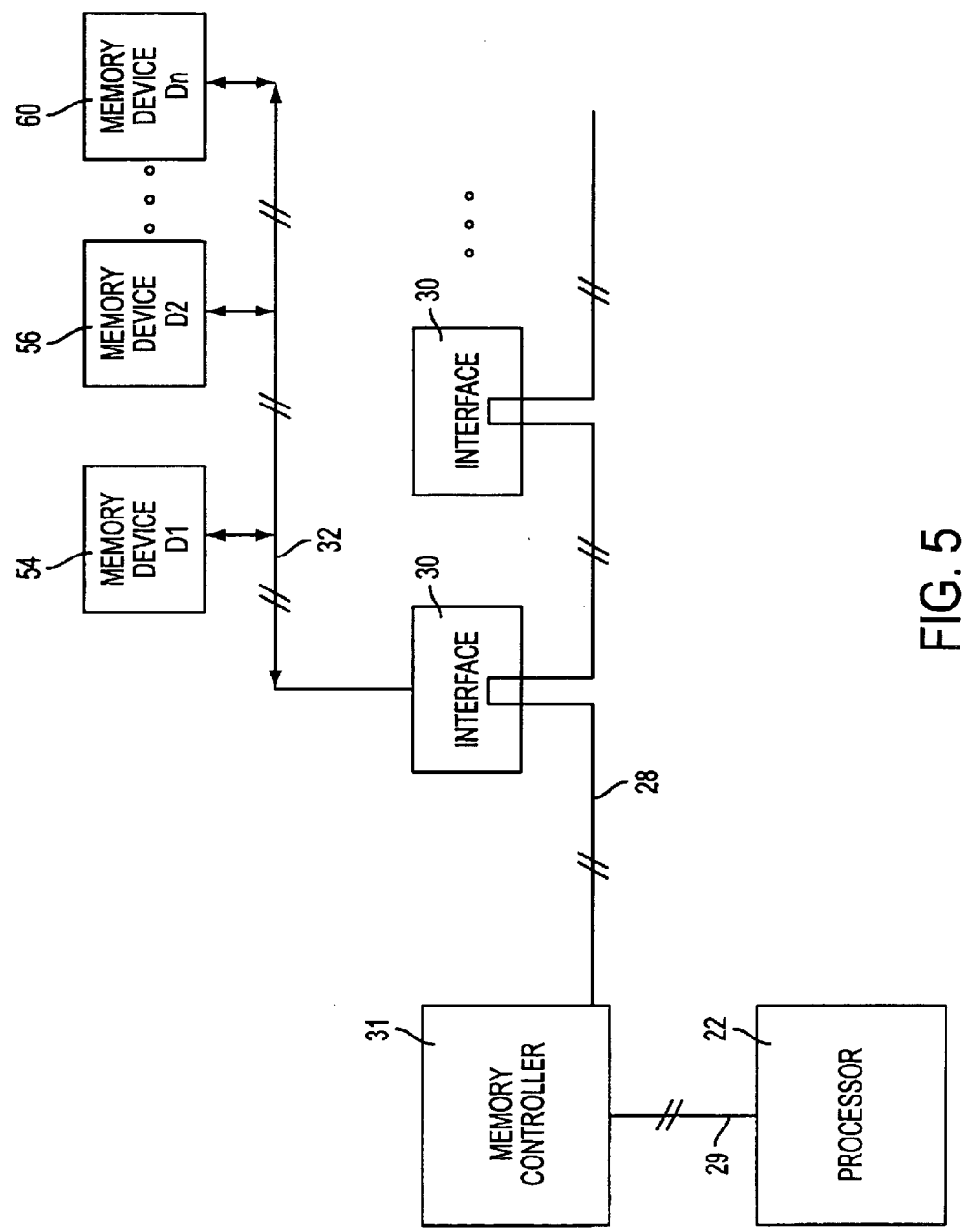
FIG. 5 illustrates a bus topology formed in accordance with another exemplary embodiment of the invention.

FIGS. 4–5 also illustrate that the memory devices 54, 56, 58, 60, attached to the memory bus 32 may be mounted on a single memory module 24 (FIG. 4) or, alternatively, may be mounted on respective printed circuit boards (PCBs) or other support structure (FIG. 5), but nevertheless each memory device 54, 56, 58, 60 is connected to the memory bus 32.

Figure 6:
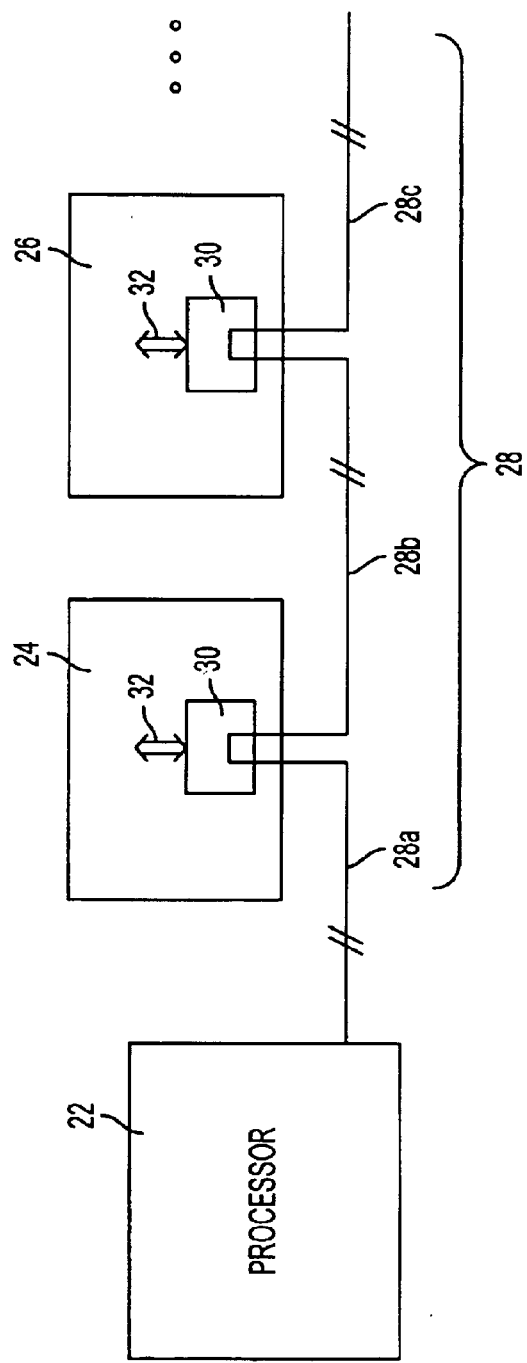
FIG. 6 illustrates a bus topology formed in accordance with another exemplary embodiment of the invention.

The memory controller 31 is connected to the segmented data bus 28 and may exchange data with each of the integrated interface circuits 30. Alternatively, as shown in FIG. 6, the memory controller 31 may be omitted and the processor 22 may be connected to the segmented data bus 28. In this arrangement, the processor 22 may exchange data over the segmented data bus 28 with each of the integrated interface circuits 30, which in turn communicate with memory devices on the memory modules 24, 26 over the second data buses 32.

The embodiment illustrated in FIG. 6 advantageously eliminates the need for a separate memory controller chip conventionally used as an intermediary between the processor and the memory devices in a typical computer system. For an exemplary system in which the integrated interface circuit 30 adds latency to data communications between devices connected to the segmented data bus 28 and the second data bus 32 (FIG. 1), any loss in performance may be alleviated by elimination of a conventional memory controller. Some functions formerly provided by a conventional memory controller, such as memory address-to-module mapping, may be performed instead at the processor 22. Other functions formerly performed by a conventional memory controller, such as voltage conversion, may be performed by the integrated interface circuit 30. Thus, the latency associated with the memory controller may be mitigated while still permitting processors and memory devices of differing voltage levels to interoperate.

Latency could also be improved by including an additional multiplexer in the integrated interface circuit 30 for performing multiplexing tasks ordinarily performed at individual memory devices on the second data bus 32. This would allow the multiplexing tasks to be performed at the higher operating rate of the integrated interface circuit 30.

Figure 17:
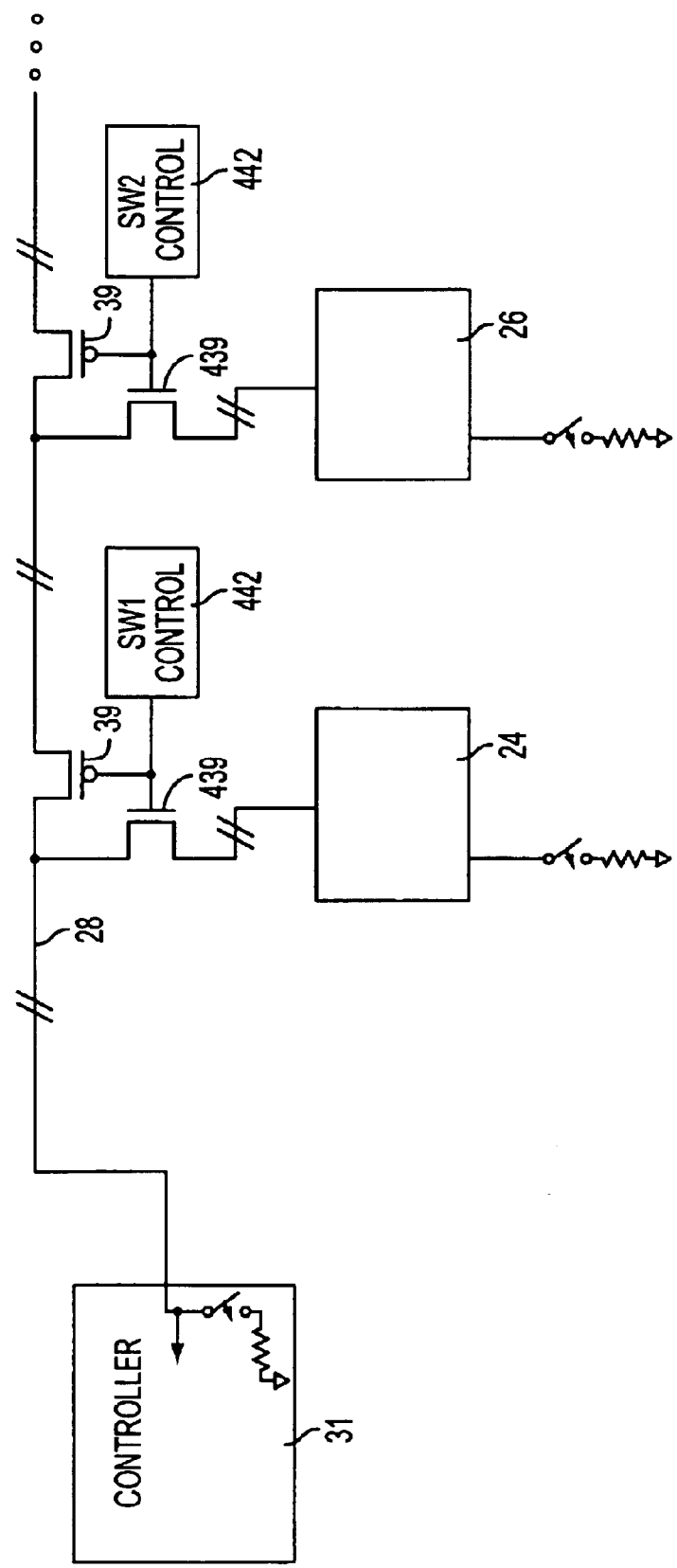
FIG. 17 illustrates a bus and switch topology formed in accordance with another exemplary embodiment of the invention.

Thus far all exemplary embodiments of the invention have been described as using one switch circuit to pass data either to a selected memory module, e.g., 24, or to a downstream bus segment, e.g., 28b. However, two switch circuits may also be used as shown in FIG. 17. FIG. 17 shows an exemplary embodiment of the invention including a first switch 39 and a second switch 439 associated with each input/output device, e.g., each memory module 24, 26. The first switch 39 can be configured to selectively connect memory modules 24, 26 to the memory controller 31 via the control circuits 442. For example, the first switch 39 may selectively disconnect the memory controller 31 from the other memory module 26. Simultaneously, the second switch 439 can be configured to selectively connect the first memory module 24 to the memory controller 31 via the control circuits 442. Preferably, the first switch 39 does not pass data while the second switch 439 passes data between the first memory module 24 and the memory controller 31, so as to provide a point-to-point data connection for improved communication performance between the first memory module 24 and the memory controller 31. Likewise, preferably the first switch 39 passes data while the second switch 439 does not pass data, so as to permit improved communications between the memory controller 31 and the other memory module 26 by reducing bus reflections, resistance, and/or capacitance that could degrade performance. Each of the switches 39, 439 corresponding to the other memory modules 26 may be controlled by the control circuits 442 in a similar fashion.

In another example, a simple two-way switch may be used in lieu of the switching circuit 39 shown in FIGS. 2 and 3. FIGS. 12 . 15 show several exemplary embodiments of the present invention using simple two-way switches 302' to connect the memory controller 31 and a selected memory module 24 (FIGS. 12, 13) or individual memory devices 54, 56, 58, 60 (FIGS. 13, 14) in a substantially stubless configuration.

FIG. 12 shows a bus and switch topology in which each of the two-way switches 302" is located separately from other system elements, for example two way switches 302" may be located on a motherboard 310. The two-way switches 302" may be controlled by a selection signal transmitted, for example, on the command and address path 135. In this case, a decoder 315 is required to decode a command for a particular switch. Alternatively, the selection signal may be included in data transmitted on the data bus 28 or a separate selection signal path for each switch 302" may be provided on the motherboard 310. When the selection signal selects a certain memory module 24, 26 for operations, the two-way switches 302" can be simultaneously configured to connect the module (e.g., 24) containing the memory devices (e.g., 54, 56, 58, 60) with the memory controller 31. For example, if the first memory module 24 were selected for operations, the first switch 302"(a) can be configured by the selection signal to connect the memory controller 31 to the first memory module 24 in a point-to-point data connection. This configuration of the two-way switches 302" substantially eliminates bus reflections from the unused portion of the bus 28. In the above example, the unused portion of the bus 28 includes the data paths between the first and second two-way switches 302"(a) and 302"(b) and the data paths connected to the second memory module 26.

FIG. 13 shows another exemplary embodiment of a bus and switch topology in accordance with the invention. The FIG. 13 structure is similar to that of FIG. 2. In FIG. 13, the two-way switches 302' are not located separately from the memory modules 24, 26, but instead are each located on a memory module 24,26, like the FET switches shown in FIGS. 2 and 3. In this embodiment, each memory module 24 includes an interface circuit 30 that may have a two-way switch 302', connected to pass data between a first bus segment 28a and memory devices 54, 56, 58, 60, or between first and second bus segments 28a, 28b, depending on the state of the two-way switch 302'. Data may be passed between the memory controller 31 and a conversion circuit 45 on the first bus segment when the two-way switch 302' is in a first state, and when the two-way switch 302' is in a second state data may be passed between the first and second bus segments 28a and 28b. This topology permits point-to-point data communications between a memory module 24, 26 and the memory controller 31, when a given module 24, 26 is selected. In addition, the interface circuit 30 may also include a conversion circuit 45 as shown including a voltage converter 48, a multiplexer/demultiplexer 46 and a coder/decoder 47 for performing data rate, encoding, and voltage level conversions, as noted in connection with FIG. 2.

FIG. 14 shows another exemplary embodiment of a bus topology in which the two-way switches 302''' are located on the memory devices 54, 56, 60. For example, each of the memory devices 54, 56, 60 may be included on individual integrated circuit chips, and a two-way switch 302''' may also be located on the integrated circuit chip for each memory device 54, 56, 60. Each memory device 54, 56, 60 may be required to have an input and an output data path to connect the two way switches 302''' in the serial fashion illustrated in FIG. 14. In operation, the switches 302''' may be configured to select one of the memory devices 54, 56, 60 at a time for communications with the memory controller 31.

Figure 15:
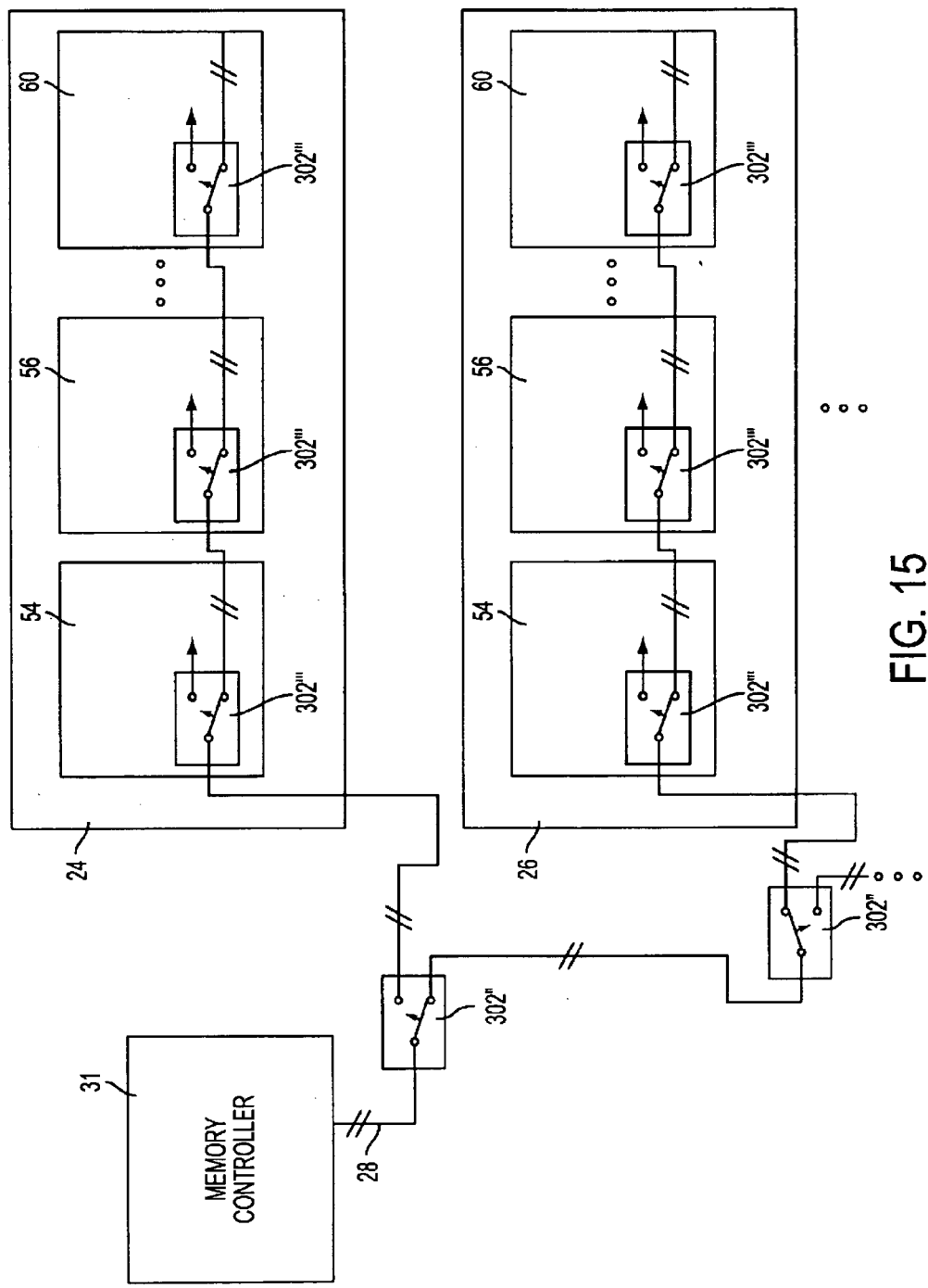
FIG. 15 illustrates a bus and switch topology formed in accordance with another exemplary embodiment of the invention.

FIG. 15 illustrates another exemplary embodiment of the invention which combines the bus and switch topologies shown in FIG. 12 and FIG. 14. In this embodiment, a memory module 24, 26 is selected by the switches 302", while a memory device is selected by the switches 302'''.

In FIGS. 12–15, although each of the segments of data bus 28 is shown for simplicity as a single line connected to a single switch, it is to be understood that each of the segments of the data bus 28 may include a plurality of data paths and would thus be connected to a respective plurality of two-way switches 302'. In addition, each of the two-way switches 302' may be included in an integrated interface circuit 30 of the type described above in connection with FIGS. 2 and 3, e.g., one example of which is shown in FIG. 13.

Referring back to FIG. 1, the integrated interface circuit 30 allows devices of different technologies to communicate and exchange data. For example, data may be exchanged between a processor and memory modules 24, 26 (either directly or through the memory controller 31) at high speed using the segmented data bus 28, while the second data bus 32 may connect to memory devices that operate at a lower speed. In this example, the slower data rate of the bus 32 connected to the memory devices allows for the use of inexpensive memory integrated circuits (ICs).

Moreover, use of a segmented data bus 28 may permit the construction of a non-parallel terminated network of devices. Referring to FIG. 1, each of the devices on the bus, including the memory controller 31 and other system devices 24, 26, is connected to respective segments 28a, 28b, 28c of the segmented data bus 28 to form a "daisy chain." Such a bus system may permit implementation of a memory subsystem with smaller drivers of lower capacitance, lower voltage level in the individual segments 28a, 28b (i.e., reduced DC load current), and having decreased power consumption.

Figure 18:
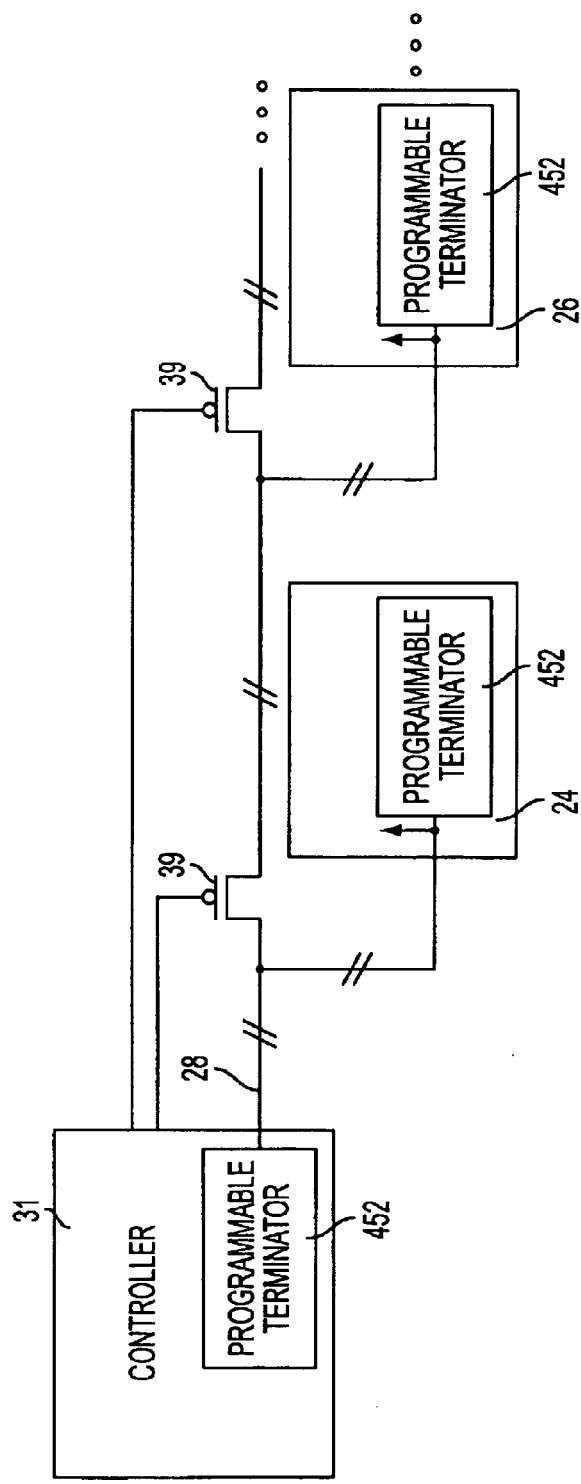
FIG. 18 illustrates a bus and switch topology formed in accordance with another exemplary embodiment of the invention.

When a device is removed from segmented data bus 28, e.g., a memory module is absent, a low cost jumper 55 or other simple continuity module (CM) may be used to maintain the continuity of the bus 28, as shown in FIG. 8. In addition, as shown in FIG. 18 programmable active termination may be used in combination with the switching circuits 39 in order to further improve data transfer performance. During data transmission between the memory controller 31 and a memory module 24, 26, programmable active termination at either the memory module 24, 26 or the memory controller 31 may be used to properly terminate the circuit elements during READ and WRITE operations. For example, referring to FIG. 18, a programmable terminator 452 may be located at the memory controller 31 and activated during READ operations to properly terminate the transmission path of the data at the memory controller 31.

Another programmable terminator 452 may be located at each memory module 24, 26 and activated during WRITE operations to properly terminate the transmission path at the memory module 24, 26 that is the source of the READ data. The programmable terminators 452 may be programmed by the memory controller 31 or another mechanism for coordinating READ and WRITE operations using, for example, a strap or hardwired data connection. For example, the programmable terminator 452 may be programmed using a pin or a register on the memory module 24, 26 or memory controller 31. Programmable active termination is further described in an application for patent with Ser. No. 09/659, 334, entitled "ACTIVE TERMINATION IN A MULTI-DROP MEMORY SYSTEM," filed Sep. 12, 2000, and is incorporated by reference herein.

In addition, another exemplary embodiment of the invention may include switching circuits, e.g., FET switches 39, having programmable drive strength, for example as illustrated in FIG. 16. Each of the FET switches 39 may have a programmable drive strength controlled by the memory controller 31. For example, in FIG. 16 the drive strength of each of the p-channel FET switches 39 may be controlled by the voltage applied to the gate of the switch 39 as determined by the memory controller 31. One embodiment of the invention may use a different drive strength for one or more switches 39 depending on which memory module 24, 26 is selected for READ or WRITE operations.

Figure 10:
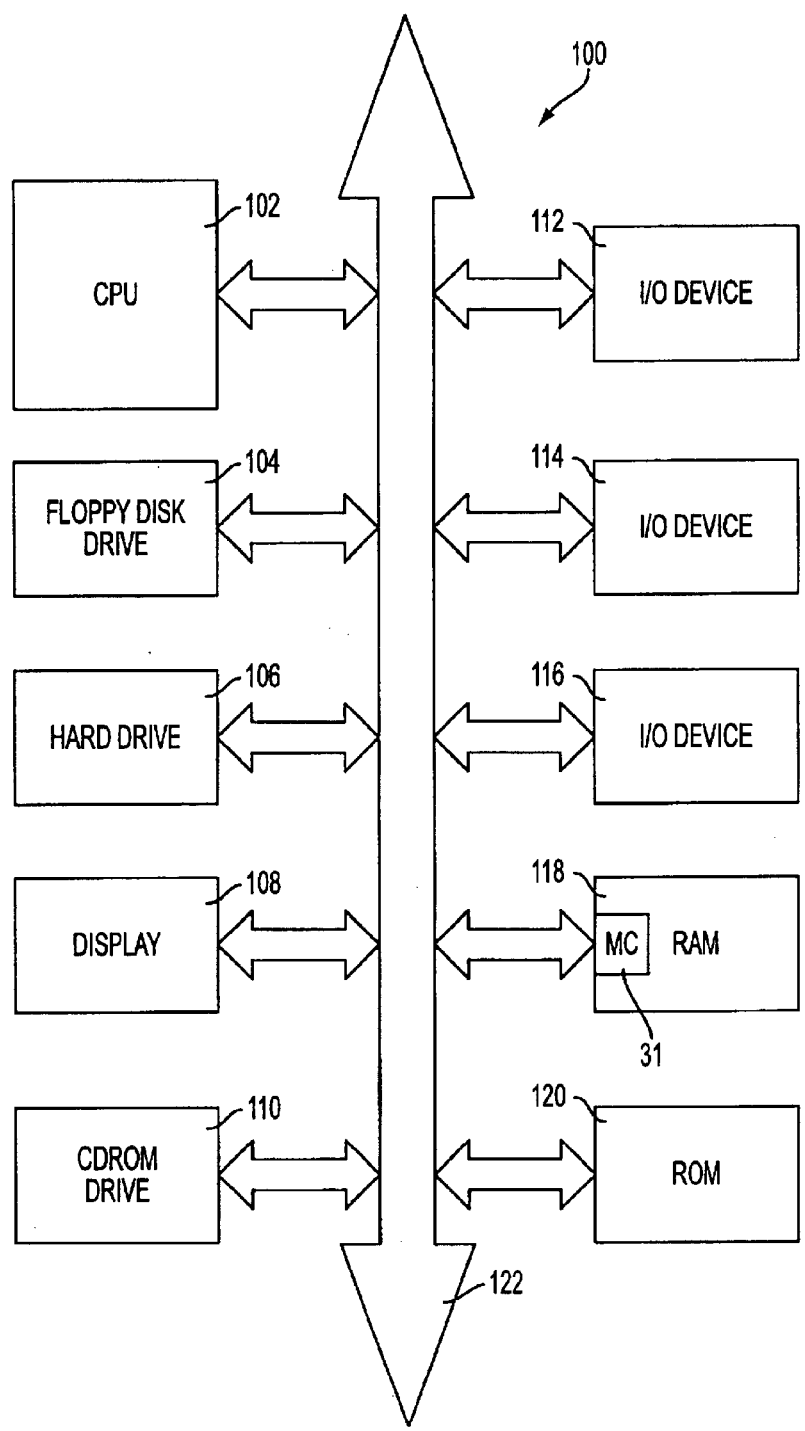
FIG. 10 illustrates a processor system formed in accordance with another exemplary embodiment of the invention.

FIG. 10 illustrates another exemplary processor system which may include a segmented data bus 28. Referring to FIG. 10, the processor system, which may be a computer system 100, for example, generally comprises a central processing unit (CPU) 102, for example, a microprocessor, that communicates with one or more input/output (I/O) devices 112, 114, 116 over a system bus 122. The computer system 100 also includes random access memory (RAM) 118, a read only memory (ROM) 120 and, in the case of a computer system may include peripheral devices such as a floppy disk drive 104, a hard drive 106, a display 108 and a compact disk (CD) ROM drive 110 which also communicate with the processor 102 over the bus 122. The RAM 118 includes memory devices communicating with a memory controller 31 via a segmented data bus 28 and switches constructed in accordance with the invention. This configuration of the computer system 100 permits high speed communication and/or data transfer between different types of data devices, for example between the processor 102 and the memory controller 31 at the RAM 118. It should be noted that FIG. 10 is merely representative of many different types of processor system architectures which may employ the invention.

As noted, the segmented data bus 28 may be terminated by bus terminators, e.g., bus terminating resistors 38, located at the memory controller 31 as shown in FIG. 1, at one end of the bus 28 as shown in FIG. 8, at the interface circuit 30 as shown in FIGS. 2, 3 and 13, at the memory modules 24, 26 as shown in FIG. 12, and/or at each memory device 54, 56, 60 as shown in FIG. 14. The bus terminating resistors 38 may be switched terminators to permit switchable termination (i.e., termination enabled (ON) or termination disabled (OFF)) for varying data transfer operations. An exemplary switched terminator 38 may also provide source termination for alleviation of the effect of bus reflections, improving data transfer performance.

Although the segmented data bus 28 has been described with reference to a digital data system, e.g., a memory system having memory modules 24, 26, the segmented data bus 28 can be used to transmit signals of any types, including analog, digital and radio frequency (RF) signals.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A data transmission circuit, comprising:
   a first bus segment of a data bus;
   a second bus segment of said data bus; and
   a first switching circuit connected between said first and second segments of said data bus;
   a second switching circuit connected between said second segment of said data bus and a third segment of said data bus; wherein
   said first switching circuit is configured to selectively connect said first and second segments of said data bus such that when said first switching circuit is in a first state,
   said first switching circuit passes data through from said first bus segment to said second bus segment and from said second bus segment to said first bus segment,
   when said first switching circuit is in a second state, said second bus segment is disconnected from said first bus segment and data is passed through from said first bus segment to at least one I/O circuit and from said at least one I/O circuit to said first bus segment,
   said second switching circuit is configured to selectively connect said second and third segments of said data bus such that when said second switching circuit is in a first state, said second switching circuit passes data through from said second bus segment to said third bus segment and from said third bus segment to said second bus segment, and
   when said second switching circuit is in a second state, said third bus segment is disconnected from said second bus segment and data is passed through from said second bus segment to at least one I/O circuit and from said at least one I/O circuit to said second bus segment.

2. A data transmission circuit as in claim 1, further comprising a plurality of switching circuits each configured to selectively pass data between segments of said data bus when in said first state, and between a segment of said data bus and at least one I/O circuit when in said second state.

3. A data transmission circuit as in claim 1, wherein said first switching circuit includes a two-way switch that couples said first and second bus segments when said switching circuit is in said first state, and couples said first bus segment to said at least one I/O circuit when said switching circuit is in said second state.

4. A data transmission circuit as in claim 1, wherein said first switching circuit selectively connects said first and second segments of said data bus according to a selection signal received on a command and address bus.

5. A data transmission circuit as in claim 1, wherein said first switching circuit selectively connects said first and second segments of said data bus according to a selection signal received on said data bus.

6. A data transmission circuit as in claim 1, wherein said first switching circuit selectively connects said first and second segments of said data bus according to a selection signal received on at least one dedicated selection data path.

7. A data transmission circuit as in claim 1, wherein said data bus is a multidrop bus.

8. A data transmission circuit as in claim 1, wherein said data bus is a substantially stubless data bus.

9. A data transmission circuit as in claim 1, wherein said first switching circuit includes a p-channel field-effect transistor (FET) switch.

10. A data transmission circuit as in claim 1, wherein said first switching circuit includes a p-channel field-effect transistor (FET) switch and an n-channel FET switch.

11. A data transmission circuit as in claim 1, wherein said first switching circuit is formed using Gallium Arsenide (GaAs) semiconductor technology.

12. A data transmission circuit as in claim 1, wherein said first switching circuit has a programmable drive strength.

13. A data transmission circuit as in claim 1, wherein said first switching circuit is located on a motherboard.

14. A data transmission circuit as in claim 1, wherein said first switching circuit is located on a memory module.

15. A data transmission circuit as in claim 1, wherein said first switching circuit is located on a same integrated circuit chip as a memory device.

16. A data transmission circuit, comprising:
a first bus segment of a data bus;
a second bus segment of said data bus; and
a first switching circuit connected between said first and second segments of said data bus,
wherein
said first switching circuit is configured to selectively connect said first and second segments of said data bus such that when said first switching circuit is in a first state, said first switching circuit passes data through from said first bus segment to said second bus segment and from said second bus segment to said first bus segment,
when said first switching circuit is in a second state, said second bus segment is disconnected from said first bus segment and data is passed through from said first bus segment to at least one I/O circuit and from said at least one I/O circuit to said first bus segment, and
when said first switching circuit receives a command selecting at least one attached I/O circuit for point-to-point communications, said first switching circuit selects said second state to disconnect said first bus segment from said second bus segment, and passes data between said first bus segment and said at least one attached selected I/O circuit.

17. A data transmission circuit, comprising:
a first bus segment of a data bus;
a second bus segment of said data bus; and
a first switching circuit connected between said first and second segments of said data bus,
wherein
said first switching circuit is configured to selectively connect said first and second segments of said data bus such that when said first switching circuit is in a first state, said first switching circuit passes data through from said first bus segment to said second bus segment and from said second bus segment to said first bus segment,
when said first switching circuit is in a second state, said second bus segment is disconnected from said first bus segment and data is passed through from said first bus segment to at least one I/O circuit and from said at least one I/O circuit to said first bus segment,
said data bus is a first data bus having a first number of data paths,
said first switching circuit is further configured to connect to a second data bus having a second number of data paths, and
said first switching circuit is connected between said first and second data buses for selectively receiving data on said first data bus and placing said data on said second data bus and selectively receiving data on said second data bus and placing said data on said first data bus.

18. A data transmission circuit as in claim 17, wherein said first switching circuit performs a data rate conversion between said first and second data buses.

19. A data transmission circuit as in claim 18, wherein said first switching further comprises at least one of a multiplexer and demultiplexer for performing said data rate conversion.

20. A data transmission circuit as in claim 17, wherein said first switching circuit further comprises at least one of a coder and decoder that performs at least one of a data encoding and decoding conversion between said first and second data buses.

21. A data transmission circuit as in claim 17, wherein said first switching circuit further comprises a voltage converter that performs a voltage level conversion between said first and second data buses.

22. A data transmission circuit as in claim 17, wherein said first number of data paths is less than said second number of data paths.

23. A data transmission circuit as in claim 17, wherein said second data bus is connected to said at least one I/O circuit.

24. A data transmission circuit as in claim 23, wherein said at least one I/O circuit includes a programmable bus terminator.

25. A data transmission circuit as in claim 17, wherein said first data bus is connected to a memory controller.

26. A data transmission circuit as in claim 25, wherein said memory controller includes a programmable bus terminator.

27. A data transmission circuit as in claim 17, wherein said first data bus is connected to a processor.

28. A data transmission circuit as in claim 17, wherein said first switching circuit is connected to said first bus segment of said first data bus via a first set of I/O pins and to said second bus segment via a second set of I/O pins.

29. A data transmission circuit as in claim 28, wherein said data transmission circuit comprises a plurality of said switching circuits connected between said first and second segments of said first data bus via said first and second sets of I/O pins.

30. A data transmission circuit as in claim 17, wherein said first data bus operates at a first data rate faster than a second data rate at which said second data bus operates.

31. A data transmission circuit as in claim 17, wherein said first data bus operates at a first voltage level less than a second voltage level at which said second data bus operates.

32. A data transmission circuit as in claim 17, wherein said first data bus transmits analog signals.

33. A data transmission circuit as in claim 17, wherein said first data bus transmits digital signals.

34. A data transmission circuit as in claim 17, wherein said first data bus transmits radio-frequency (RF) signals.

35. A data transfer interface, comprising:
a first bus segment of a data bus;
a second bus segment of said data bus; and
an interface circuit connected between said first and second segments of said data bus;
wherein
said interface circuit includes a switching circuit configured to selectively connect said first and second segments of said data bus such that when said switching circuit is in a first state, said switching circuit passes data through from said first bus segment to said second bus segment and from said second bus segment to said first bus segment, and when said switching circuit is in a second state, said interface circuit receives and transmits data on said data bus and said second bus segment is disconnected from said first bus segment, and when said interface circuit receives a command selecting the interface circuit for point-to-point communications, said interface circuit selects said second state of said switching circuit to disconnect said first bus segment from said second bus segment, and performs at least one of receiving and transmitting data on said data bus using said first bus segment.

36. An interface as in claim 35, wherein when said switching circuit is in said first state, said interface circuit does not receive or transmit data on said data bus.

37. An interface as in claim 35, wherein when said switching circuit is in said second state, said interface circuit receives and transmits data using said first segment of said data bus in a point-to-point data communications configuration.

38. An interface as in claim 35, wherein said switching circuit includes a field effect transistor (FET) switch.

39. An interface as in claim 38, wherein said FET switch includes a p-channel transistor.

40. An interface as in claim 35, wherein said switching circuit selectively connects said first and second segments of said data bus according to a selection signal received on a command and address bus.

41. An interface as in claim 35, wherein said switching circuit selectively connects said first and second segments of said data bus according to a selection signal received on said data bus.

42. An interface as in claim 35, wherein said switching circuit selectively connects said first and second segments of said data bus according to a selection signal received on at least one dedicated selection data path.

43. An interface as in claim 35, wherein said data bus is a multidrop bus.

44. An interface as in claim 35, wherein said data bus is a substantially stubless data bus.

45. An data transfer interface, comprising:
a first data bus having a first number of data paths, said first data bus comprising:
a first bus segment; and
a second bus segment;
a second data bus having a second number of data paths; and
an interface circuit connected between said first segment of said data bus, said second segment of said first data bus, and said second data bus;
wherein
said interface circuit includes a switching circuit configured to selectively connect said first and second segments of said data bus such that when said switching circuit is in a first state, said switching circuit passes data through from said first bus segment to said second bus segment and from said second bus segment to said first bus segment, and when said switching circuit is in a second state, said interface circuit receives and transmits data on said data bus and said second bus segment is disconnected from said first bus segment, and
said interface circuit selectively receives data on said first data bus and places said data on said second data bus, and selectively receives data on said second data bus and places said data on said first data bus.

46. An interface as in claim 45, wherein said interface circuit performs a data rate conversion between said first and second data buses.

47. An interface as in claim 46, wherein said interface circuit further comprises at least one of a multiplexer and demultiplexer for performing said data rate conversion.

48. An interface as in claim 45, wherein said interface circuit further comprises at least one of a coder and decoder that performs at least one of a data encoding and decoding conversion between said first and second data buses.

49. An interface as in claim 45, wherein said interface circuit further comprises a voltage converter that performs a voltage level conversion between said first and second data buses.

50. An interface as in claim 45, wherein said first number of data paths is less than said second number of data paths.

51. An interface as in claim 45, wherein said second data bus is connected to at least one memory device.

52. An interface as in claim 45, wherein said first data bus is connected to a memory controller.

53. An interface as in claim 45, wherein said first data bus is connected to a processor.

54. An interface as in claim 45, wherein said interface circuit is connected to said first bus segment of said first data bus via a first set of I/O pins and to said second bus segment via a second set of I/O pins, and I/O pins of said first set are connected to respective I/O pins of said second set through said switching circuit.

55. An interface as in claim 45, wherein said first data bus operates at a first data rate faster than a second data rate at which said second data bus operates.

56. An interface as in claim 45, wherein said first data bus operates at a first voltage level less than a second voltage level at which said second data bus operates.

57. An interface as in claim 45, wherein said first data bus transmits analog signals.

58. An interface as in claim 45, wherein said first data bus transmits digital signals.

59. An interface as in claim 45, wherein said first data bus transmits radio-frequency (RF) signals.

60. An interface as in claim 45, wherein said interface circuit selects data for receipt and transmission on said first data bus according to a selection signal received on a command and address bus.

61. An interface as in claim 60, wherein said selection signal controls said switching circuit, whereby said first segment is disconnected from said second segment while data is being received and transmitted on said first data bus.

62. A memory module, comprising:
at least one memory device; and
a data transfer interface for connection to a segmented data bus, said data transfer interface being coupled to said at least one memory device and comprising:
a first segment of said data bus;
a second segment of said data bus; and
an interface circuit configured for connection between said first and second segments of said data bus,
wherein
said interface circuit includes a switching circuit configured to selectively connect said first and second segments of said data bus such that when said switching circuit is in a first state, said switching circuit passes data through from said first bus segment to said second bus segment and from said second bus segment to said first bus segment, and when said switching circuit is in a second state, said interface circuit receives and transmits data on said data bus and said second bus segment is disconnected from said first bus segment.

63. A memory system, comprising:
at least one memory device; and
a data transfer interface connected to a first segmented data bus and to said at least one memory device by a second data bus, said data transfer interface comprising:
a first segment of said first data bus;
a second segment of said first data bus; and
an interface circuit connected between said first and second segments of said first data bus,
wherein
said interface circuit includes a switching circuit configured to selectively connect said first and second segments of said first data bus such that when said switching circuit is in a first state, said switching circuit passes data through from said first bus segment to said second bus segment and from said second bus segment to said first bus segment, and when said switching circuit is in a second state, said interface circuit receives and transmits data on said first data bus and said second bus segment is disconnected from said first bus segment.

64. A memory system as in claim 63, wherein said at least one memory device is included in a memory module.

65. A memory system as in claim 63, wherein said switching circuit includes a field effect transistor (FET) switch.

66. A memory system as in claim 65, wherein said FET switch includes a p-channel transistor.

67. A memory system as in claim 63, wherein said interface circuit further comprises at least one conversion circuit which performs a data rate conversion between said first and second data buses.

68. A memory system as in claim 67, wherein said at least one conversion circuit comprises at least one of a multiplexer and demultiplexer.

69. A memory system as in claim 63, wherein said interface circuit further comprises a multiplexer and a demultiplexer which perform data rate conversions for data received on said first data bus that is placed on said second data bus and for data received on said second data bus that is placed on said first data bus.

70. A memory system as in claim 63, wherein said interface circuit further comprises at least one of a coder and decoder that performs at least one of a data encoding and decoding conversion between said first and second data buses.

71. A memory system as in claim 63, wherein said interface circuit further comprises a voltage converter that performs a voltage level conversion between said first and second data buses.

72. A memory system as in claim 63, wherein said first number of data paths is less than said second number of data paths.

73. A memory system as in claim 63, wherein said first data bus is connected to a memory controller.

74. A memory system as in claim 63, wherein said first data bus is connected to a processor.

75. A memory system as in claim 63, wherein said interface circuit is connected to said first bus segment of said first data bus via a first set of I/O pins and to said second bus segment via a second set of I/O pins, and I/O pins of said first set are connected to respective I/O pins of said second set through said switching circuit.

76. A memory system as in claim 63, wherein said first data bus operates at a first data rate faster than a second data rate at which said second data bus operates.

77. A memory system as in claim 63, wherein said first data bus operates at a first voltage level less than a second voltage level at which said second data bus operates.

78. A memory system as in claim 63, wherein said first data bus transmits analog signals.

79. A memory system as in claim 63, wherein said first data bus transmits digital signals.

80. A memory system as in claim 63, wherein said first data bus transmits radio-frequency (RF) signals.

81. A memory system as in claim 63, wherein said interface circuit selects data for receipt from said first data bus according to a selection signal received on a command and address bus.

82. A memory system as in claim 81, wherein said selection signal controls said switching circuit, whereby said first segment is disconnected from said second segment while data is being received from said first data bus.

83. A memory system as in claim 63, wherein said interface circuit is further configured to selectively receive data on said second data bus and place said data on said first data bus.

84. A memory system as in claim 63, wherein said interface circuit selects data for receipt from said second data bus according to a selection signal received on a command and address bus.

85. A memory system as in claim 84, wherein said selection signal controls said switching circuit, whereby said first segment is disconnected from said second segment while data is being placed on said first data bus.

86. A memory system as in claim 63, wherein said first data bus is a multidrop bus.

87. A memory system as in claim 63, wherein said first data bus is a substantially stubless data bus.

88. A data exchange system, comprising:
a data bus having a plurality of bus segments; and
a plurality of system devices each connected to said first data bus, at least one of said system devices including a switching circuit connected between first and second bus segments of said data bus for selectively passing data through from said first bus segment to said second bus segment and from said second bus segment to said first bus segment, and for selectively disconnecting said second bus segment from said first bus segment to permit point-to-point data communications between said at least one system device and another system device using one of said first and second bus segments;
wherein a switchable terminator is included in at least one of said plurality of system devices.

89. A system as in claim 88, wherein said switching circuit includes a field effect transistor (FET) switch.

90. A system as in claim 89, wherein said FET switch includes a p-channel transistor.

91. A system as in claim 88, wherein said plurality of system devices includes a processor.

92. A system as in claim 88, wherein said plurality of system devices includes a memory controller.

93. A system as in claim 88, wherein said plurality of system devices includes a bus terminator.

94. A system as in claim 88, wherein said plurality of system devices includes a memory module.

95. A system as in claim 88, wherein said plurality of system devices includes a memory device.

96. A system as in claim 88, wherein said plurality of system devices includes an interface circuit for communication with other system devices connected to a second data bus.

97. A system as in claim 88, wherein a programmable terminator is included in at least one of said plurality of system devices.

98. A processor system comprising;
a processor;
at least one memory subsystem connected to said processor; and
a segmented bus which connects each of a controller and at least one memory subsystem interface circuit of said at least one memory subsystem;
whereby
said memory subsystem interface circuit couples at least one memory device to said segmented bus,
said memory subsystem interface circuit including a conversion circuit and a switching circuit, said conversion circuit receiving data from said segmented bus, converting it to data which can be processed by said at least one memory device, receiving data from said at least one memory device and converting it to data which can be transmitted over said segmented bus,
said switching circuit being connected between first and second bus segments of said segmented bus such that when said switching circuit is in a first state, said switching circuit passes data through from said first bus segment to said second bus segment and from said second bus segment to said first bus segment, and when said switching circuit is in a second state, said interface circuit receives and transmits data on said first data bus and said second bus segment is disconnected from said first bus segment.

99. A system as in claim 98, wherein said switching circuit includes a field effect transistor (FET) switch.

100. A system as in claim 99, wherein said FET switch includes a p-channel transistor.

101. A system as in claim 98, wherein said controller resides on a same printed circuit board as said processor.

102. A system as in claim 98, wherein said controller is integrated into said processor.

103. A method of data communication between devices in an electronic circuit, comprising:
connecting at least one switching circuit between segments of a data bus;
selectively passing data on said data bus through from a first bus segment to a second bus segment and from said second bus segment to said first bus segment, said selective passing of data being performed using said switching circuit, whereby when said data passing is not selected said switching circuit disconnects said first bus segment from said second bus segment to permit point-to-point data communications using one of said first and second bus segments
wherein said selective passing of data includes configuring said at least one switching circuit to pass data during WRITE operations.

104. A method of data communication between devices in an electronic circuit, comprising:
connecting at least one switching circuit between segments of a data bus; and
selectively passing data on said data bus through from a first bus segment to a second bus segment and from said second bus segment to said first bus segment, said selective passing of data being performed using said switching circuit, whereby when said data passing is not selected said switching circuit disconnects said first bus segment from said second bus segment to permit point-to-point data communications using one of said first and second bus segments;
wherein said selective passing of data includes configuring said at least one switching circuit to pass data between a memory controller and a selected I/O device during READ operations.

105. A method of data communication between devices in an electronic circuit, comprising:
connecting at least one switching circuit between segments of a data bus; and
selectively passing data on said data bus through from a first bus segment to a second bus segment and from said second bus segment to said first bus segment, said selective passing of data being performed using said switching circuit, whereby when said data passing is not selected said switching circuit disconnects said first bus segment from said second bus segment to permit point-to-point data communications using one of said first and second bus segments;
wherein said selective passing of data includes configuring said at least one switching circuit to pass data between a memory controller and a selected I/O device during WRITE operations.

106. A method of data communication between devices in an electronic circuit, comprising:
connecting a first set of I/O pins of an interface circuit to a first segment of a data bus;
connecting a second set of I/O pins of said interface circuit to a second segment of said data bus;
receiving and transmitting data on at least said first segment of said data bus using at least said first set of I/O pins; and
selectively passing data on said data bus through from said first bus segment to said second bus segment and from said second bus segment to said first bus segment, said selective passing of data being performed using a switching circuit;
wherein when said data passing is not selected said switching circuit disconnects said first bus segment from said second bus segment to permit point-to-point data communications using one of said first and second bus segments.

107. A method of data communication between devices in an electronic circuit, comprising:
connecting an interface circuit having first and second sets of I/O pins to respective first and second segments of a first data bus that operates at a first data rate;
connecting said interface circuit to a second data bus that operates at a second data rate;
receiving and transmitting data on said first data bus using said first and second sets of I/O pins;
receiving and transmitting data on said second data bus;
selectively converting data received from one of said first and second data buses for use on the other of said first and second data buses; and
selectively passing data on said first data bus through from said first bus segment to said second bus segment and from said second bus segment to said first bus segment, said selective passing of data being performed using a switching circuit, whereby when said data passing is not selected said switching circuit disconnects said first bus segment from said second bus segment to permit point-to-point data communications using one of said first and second bus segments.

108. A method as in claim 107, wherein said selectively converting data includes using a selection signal to determine whether to convert for use on the other of said first and second data buses.

109. A method as in claim 108, wherein said selective conversion of data is performed when said interface circuit is selected for operation by said selection signal.

110. A method as in claim 108, wherein said selective conversion of data is not performed when said interface circuit is not selected for operation by said selection signal.

111. A method as in claim 107, wherein said first data rate is faster than said second data rate.

112. A method as in claim 107, further comprising converting received data between said first data rate of said first data bus and said second data rate of said second data bus.

113. A method as in claim 107, further comprising converting received data between a first encoding of said first data bus and a second encoding of said second data bus.

114. A method as in claim 107, further comprising converting received data between a first voltage level of said first data bus to a second voltage level of said second data bus.

115. A method as in claim 114, wherein said first voltage level is less than said second voltage level.

116. A method as in claim 107, wherein said first data bus connects to said first and second sets of I/O pins using a first bus width different from a second bus width used to connect said interface circuit to said second data bus.

117. A method as in claim 116, wherein said first bus width is less than said second bus width.

118. A method as in claim 107, wherein devices of a first technology communicate with said interface circuit using said first data bus and devices of a second technology communicate with said interface circuit using said second data bus.

119. A method as in claim 118, wherein said devices of said first technology include at least one processor.

120. A method as in claim 118, wherein said devices of said second technology include at least one memory device.

121. A method as in claim 107, wherein said first data bus is a multi-drop bus.

122. A method as in claim 107, wherein said first data bus is a substantially stubless data bus.

* * * * *

UNITED STATES PATENT AND TRADEMARK OFFICE
CERTIFICATE OF CORRECTION

PATENT NO. : 6,871,253 B2
DATED : March 22, 2005
INVENTOR(S) : Roy Greeff et al.

It is certified that error appears in the above-identified patent and that said Letters Patent is hereby corrected as shown below:

Column 9,
Line 3, "12 . 15" should read -- 12-15 --.

Signed and Sealed this

Thirty-first Day of May, 2005

JON W. DUDAS
*Director of the United States Patent and Trademark Office*